United States Patent
Kurasawa et al.

(10) Patent No.: US 10,423,021 B2
(45) Date of Patent: Sep. 24, 2019

(54) DETECTION DEVICE AND DISPLAY DEVICE

(71) Applicant: Japan Display Inc., Tokyo (JP)

(72) Inventors: Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/909,476

(22) Filed: Mar. 1, 2018

(65) Prior Publication Data

US 2018/0252955 A1 Sep. 6, 2018

(30) Foreign Application Priority Data

Mar. 2, 2017 (JP) ................................ 2017-039794

(51) Int. Cl.
| | | |
|---|---|---|
| G02F 1/1333 | (2006.01) | |
| G02F 1/1335 | (2006.01) | |
| G06F 3/044 | (2006.01) | |
| G06F 3/047 | (2006.01) | |
| G02F 1/1343 | (2006.01) | |

(52) U.S. Cl.
CPC ........ *G02F 1/13338* (2013.01); *G02F 1/1343* (2013.01); *G02F 1/133528* (2013.01); *G06F 3/044* (2013.01); *G06F 3/047* (2013.01)

(58) Field of Classification Search
None
See application file for complete search history.

(56) References Cited

U.S. PATENT DOCUMENTS

| | | | |
|---|---|---|---|
| 6,341,003 B1* | 1/2002 | Ashizawa | G02F 1/134363 349/125 |
| 6,528,442 B1 | 3/2003 | Kuwano et al. | |
| 9,946,915 B1* | 4/2018 | Troccoli | G06K 9/0002 |
| 2009/0315840 A1* | 12/2009 | Park | G02F 1/13338 345/173 |
| 2012/0062511 A1* | 3/2012 | Ishizaki | G06F 3/044 345/174 |
| 2012/0279549 A1* | 11/2012 | Urien | H01L 27/301 136/244 |
| 2014/0375910 A1* | 12/2014 | Tada | G06F 3/044 349/12 |
| 2018/0136524 A1* | 5/2018 | Ikegami | G02F 1/133308 |
| 2018/0181234 A1* | 6/2018 | Hammura | G06F 3/044 |

FOREIGN PATENT DOCUMENTS

| | | |
|---|---|---|
| JP | H11-322413 A | 11/1999 |
| JP | 2010-031382 A | 2/2010 |
| JP | 2012-063839 A | 3/2012 |
| JP | 2013-142194 A | 7/2013 |
| JP | 2016-126348 A | 7/2013 |

* cited by examiner

*Primary Examiner* — Christopher J Kohlman
(74) *Attorney, Agent, or Firm* — K&L Gates LLP

(57) ABSTRACT

In one embodiment, the present invention includes a substrate; a detection electrode provided in a display region on a plane parallel to the substrate, the detection electrode including a plurality of metal wires; a first conductive layer provided in a peripheral region located to the outside the display region; a protective layer provided on the detection electrode; a polarizing plate provided above the protective layer; and a second conductive layer provided between the polarizing plate and the protective layer in a direction perpendicular to the substrate. The second conductive layer has a higher sheet resistance than the metal wires and is electrically coupled to the first conductive layer.

19 Claims, 28 Drawing Sheets

DETECTION DEVICE AND DISPLAY DEVICE

CROSS-REFERENCE TO RELATED APPLICATIONS

This application claims priority from Japanese Application No. 2017-039794, filed on Mar. 2, 2017, the contents of which are incorporated by reference herein in its entirety.

BACKGROUND

1. Technical Field

The present disclosure relates to a detection device and a display device.

2. Description of the Related Art

Touch detection apparatuses, what are called touch panels, capable of detecting an external proximity object have recently been attracting attention. Touch panels are mounted on, or integrated with a display device, such as a liquid crystal display device, and used as display devices with a touch detection function. Japanese Patent Application Laid-open Publication No. 2012-063839 (JP-A-2012-063839) discloses a display device with a touch detection function that includes touch detection electrodes, a polarizing plate, and a conductive film interposed therebetween. The conductive film is provided as a preventative measure against electro-static discharge (ESD).

Such a display devices with a touch detection function may include a protective layer for protecting touch detection electrodes. In such a case, the conductive film is electrically isolated from the touch detection electrodes with the protective layer interposed therebetween, so that the conductive film is likely to be charged with static electricity applied to the polarizing plate.

SUMMARY

A detection device according to one embodiment includes a substrate, a detection electrode provided in a display region on a plane parallel to the substrate, the detection electrode including a plurality of metal wires, a first conductive layer provided in a peripheral region located to the outside of the display region, a protective layer provided on the detection electrode, a polarizing plate provided above the protective layer, and a second conductive layer provided between the polarizing plate and the protective layer in a direction perpendicular to the substrate. The second conductive layer has a higher sheet resistance than the metal wires and is electrically coupled to the first conductive layer.

A display device according to one embodiment includes a detection device described above, a plurality of pixel electrodes provided on a plane parallel to the substrate, the pixel electrodes being disposed facing the detection electrode in a matrix configuration, and a display function layer configured to be driven by signals.

A detection device according to one embodiment includes a first substrate, a plurality of detection electrodes disposed in a matrix configuration in a display region on a plane parallel to the first substrate, a second substrate facing the first substrate, a first conductive layer provided in a peripheral region located to the outside the display region in planar view, a polarizing plate provided above the second substrate, and a second conductive layer provided between the polarizing plate and the second substrate. The second conductive layer is electrically coupled to the first conductive layer.

DETAILED DESCRIPTION

Figure 1:
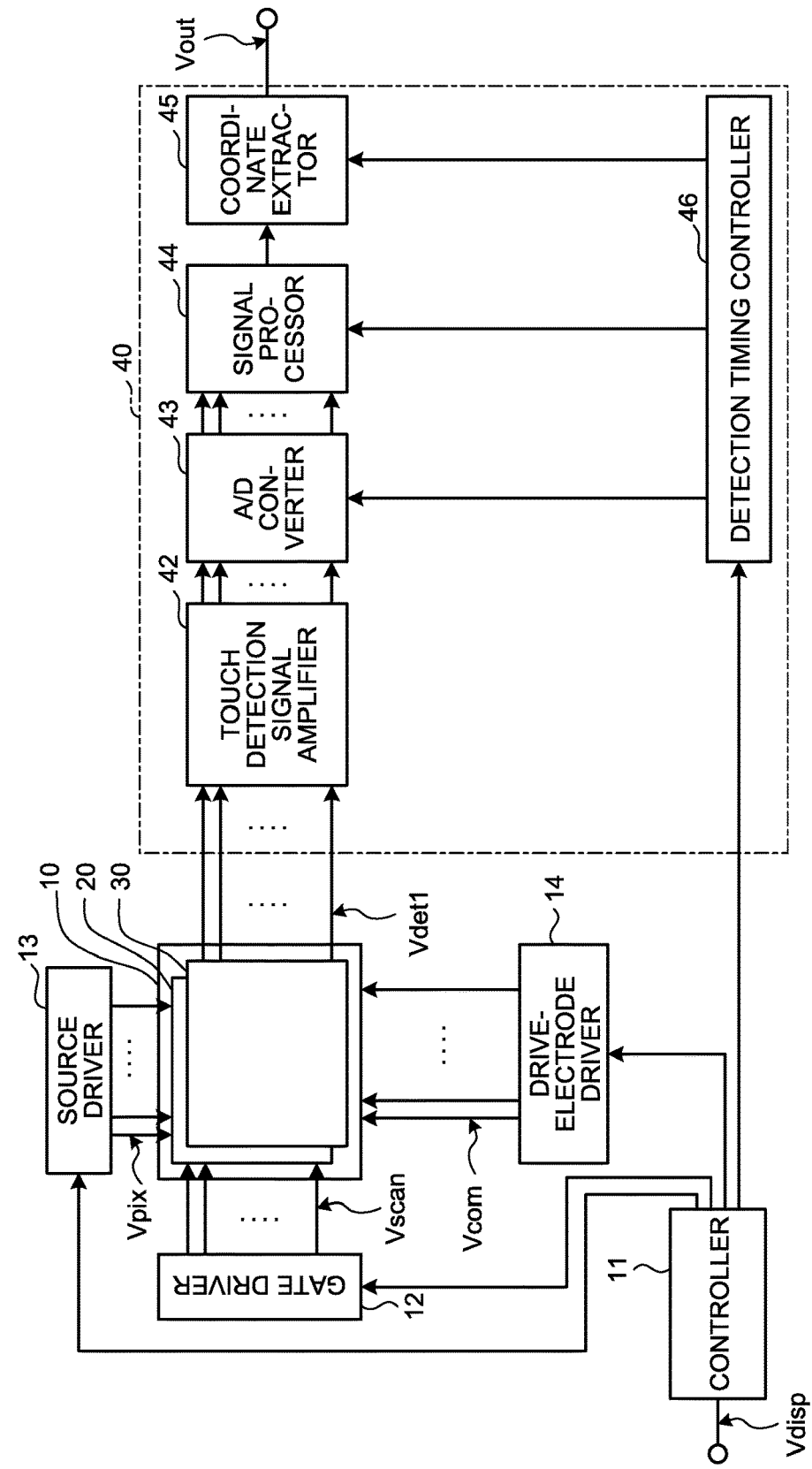
FIG. 1 is a block diagram illustrating an exemplary configuration of a display device according to a first embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. The disclosure is given by way of example only, and appropriate modifications made without departing from the spirit of the disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the disclosure. In the present specification and the figures, components similar to those previously described with reference to previous figures are denoted by like reference numerals, and overlapping explanation thereof may be appropriately omitted.

First Embodiment

FIG. 1 is a block diagram illustrating an exemplary configuration of a display device according to a first embodiment. As illustrated in FIG. 1, a display device 1 includes a display panel 10, a controller 11, a gate driver 12, a source driver 13, a drive-electrode driver 14, and a detector 40. The display panel 10 includes a display portion 20 to display images and a touch sensor 30 serving as a detection device to detect touch input.

The display panel 10 is a display device having the display portion 20 and the touch sensor 30 integrated with each other. Specifically, in the display panel 10, part of members, such as electrodes and substrates, of the display portion 20 double as electrodes and substrates of the touch sensor 30.

The display portion 20 includes liquid crystal display elements serving as display elements. The display portion 20 includes a plurality of pixels including the display elements, and includes a display surface facing the pixels. The display portion 20 receives video signals Vdisp to display an image composed of the pixels on the display surface. The display panel 10 may be an apparatus having the touch sensor 30 mounted on the display portion 20. The display portion 20 may be, for example, an organic electroluminescence (EL) display panel.

The controller 11 supplies control signals to the gate driver 12, the source driver 13, the drive-electrode driver 14, and the detector 40 based on video signals Vdisp supplied from the outside.

The gate driver 12 supplies scanning signals Vscan to one horizontal line to be a target of display drive in the display panel 10 based on control signals supplied from the controller 11. Consequently, one horizontal line to be a target of display drive is sequentially or simultaneously selected.

The source driver 13 is a circuit that supplies pixel signals Vpix to respective sub-pixels SPix (see FIG. 6) of the display portion 20.

Based on control signals supplied from the controller 11, the drive-electrode driver 14 supplies drive signals Vcom to drive electrodes COML (see FIG. 7) of the display panel 10. Part of the functions of the gate driver 12, the source driver 13, and the drive-electrode driver 14 may be incorporated in the display panel 10.

The touch sensor 30 operates based on the basic principle of capacitive touch detection, and performs touch detection based on the mutual-capacitance method (also called the mutual method). Thus, a detected object such as a finger can be detected when touching or having approached a display region. The touch sensor 30 may perform touch detection based on the self-capacitance method (also called the self method).

The detector 40 determines whether a touch is made on the touch sensor 30 based on control signals supplied from the controller 11 and a detection signal Vdet1 supplied from the touch sensor 30. If a touch is detected, the detector 40 calculates coordinates at which the touch input is performed, for example.

The detector 40 includes a touch detection signal amplifier 42, an analog/digital (A/D) converter 43, a signal processor 44, a coordinate extractor 45, and a detection timing controller 46. The detection timing controller 46 performs control such that the A/D converter 43, the signal processor 44, and the coordinate extractor 45 can operate in synchronization with one another based on control signals supplied from the controller 11.

In touch detection, the touch detection signal amplifier 42 amplifies the detection signal Vdet1 supplied from the display panel 10. The A/D converter 43 samples analog signals output from the touch detection signal amplifier 42 at a timing synchronized with the drive signal Vcom, and converts the sampled signals into digital signals.

The signal processor 44 is a logic circuit that detects whether a touch is made on the display panel 10 based on the output signals from the A/D converter 43. The signal processor 44 performs processing to extract a signal (absolute value $|\Delta V|$) of the difference between the detection signals caused by a finger. The signal processor 44 compares the absolute value $|\Delta V|$ with a certain threshold voltage, and determines, if this absolute value $|\Delta V|$ is less than the threshold voltage, that the detected object is not touching the display region. In contrast, if the absolute value $|\Delta V|$ is equal to or higher than the threshold voltage, the signal processor 44 determines that the detected object is touching or has approached the display region. The detector 40 is thus enabled to perform touch detection.

In the present specification, a "touching state" refers to a state in which the detected object is touching the display surface or has approached the display surface to the extent that it is close enough to consider it touching the display surface. The term "non-touching state" refers to a state in which a detected object is neither touching the display surface nor has yet to approach the display surface to the extent that it is close enough to consider it touching the display surface.

The coordinate extractor 45 is a logic circuit that calculates, when the signal processor 44 detects a touch, the touch panel coordinates of the touch. The coordinate extractor 45 outputs the touch panel coordinates as output signals Vout. The coordinate extractor 45 may output the output signals Vout to the controller 11. The controller 11 is capable of executing certain display operation or certain detection operation based on the output signals Vout.

The touch detection signal amplifier 42, the analog/digital (A/D) converter 43, the signal processor 44, the coordinate extractor 45, and the detection timing controller 46 of the detector 40 are installed in the display device 1. However, this example is not limiting, and all or part of the functions of the detector 40 may be installed in an external control board, an external processor, or the like. For example, the coordinate extractor 45 may be installed in an external processor independent from the display device 1. In such a case, the detector 40 may output the signals processed by the signal processor 44 as the output signals Vout. Alternatively, the signal processor 44 and the coordinate extractor 45 may be installed in an external processor. In such a case, the detector 40 may output the digital signals processed by the A/D converter 43 as the output signals Vout.

Figure 2:
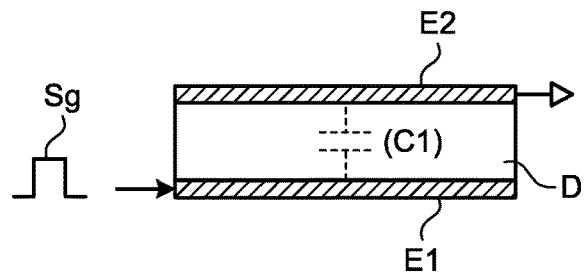
FIG. 2 is an explanatory diagram for explaining the basic principle of mutual capacitance touch detection.
Figure 3:
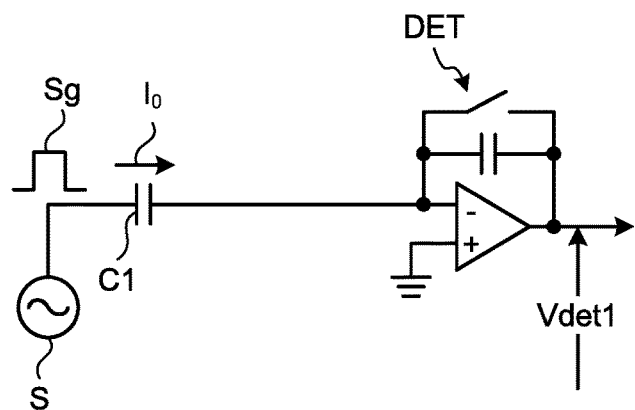
FIG. 3 is an explanatory diagram illustrating an exemplary equivalent circuit for mutual capacitance touch detection.
Figure 4:
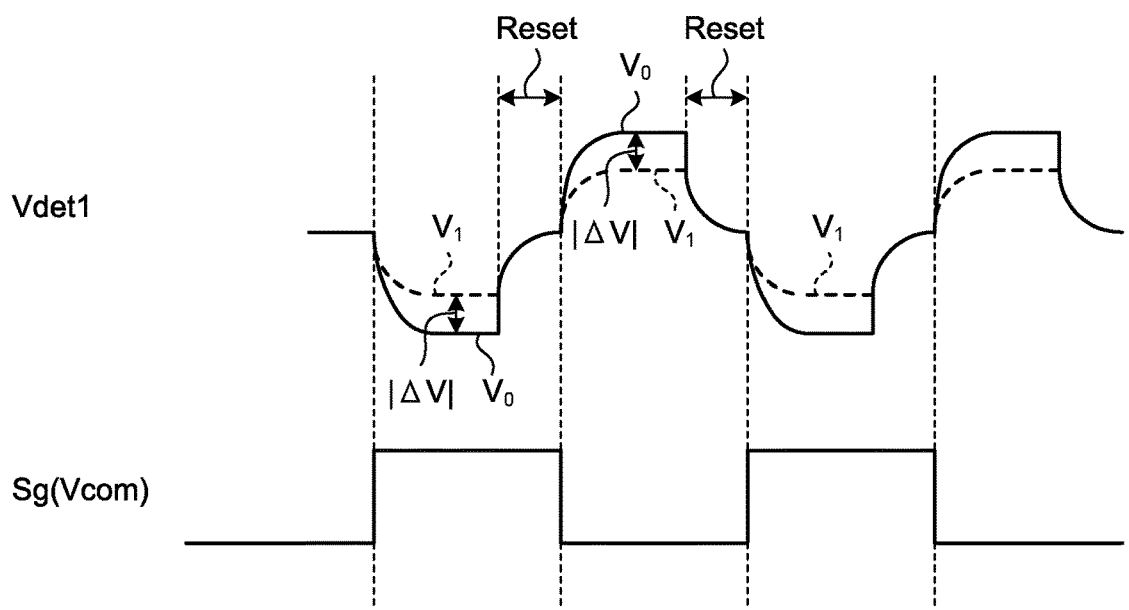
FIG. 4 is a diagram illustrating examples of waveforms of a drive signal and a detection signal for mutual capacitance touch detection.

The following describes the basic principle of mutual capacitance touch detection performed by the display device 1 of this embodiment with reference to FIG. 2 to FIG. 4. FIG. 2 is an explanatory diagram for explaining the basic principle of mutual capacitance touch detection. FIG. 3 is an explanatory diagram illustrating an exemplary equivalent circuit for mutual capacitance touch detection. FIG. 4 is a diagram illustrating examples of waveforms of a drive signal and a detection signal for mutual capacitance touch detection. While the following describes a case in which a finger touches or approaches the apparatus, the detected object is not limited to a finger and may be a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) generated between the facing surfaces of the drive electrode E1 and the detection electrode E2. As illustrated in FIG. 3, a first end of the capacitance element C1 is coupled to an alternating-current signal source (drive signal source) S, and a second end thereof is coupled to a voltage detector DET. The voltage detector DET is an integration circuit included in the touch detection signal amplifier 42 illustrated in FIG. 1, for example.

When the AC signal source S applies an AC rectangular wave Sg at a certain frequency (for example, roughly several kHz to several hundred kHz) to the drive electrode E1 (first end of the capacitance element C1), an output waveform (detection signal Vdet1) illustrated in FIG. 4 is generated via the voltage detector DET.

In the non-touching state, an electric current depending on the capacitance value of the capacitance element C1 flows. The voltage detector DET illustrated in FIG. 3 converts fluctuations in the electric current $I_0$ depending on the AC rectangular wave Sg into fluctuations in the voltage (a waveform $V_0$ indicated by the solid line (see FIG. 4)).

In the touching state, a capacitance generated by the finger is touching the detection electrode E2 or has approached the detection electrode E2 to the extent that it is close enough to consider it touching the detection electrode E2. The fringe lines of electric force between the drive electrode E1 and the detection electrode E2 are blocked by a conductor (finger). As a result, the capacitance element C1 acts as a capacitance element having a capacitance value smaller than that in the non-touching state. The voltage detector DET converts fluctuations in an electric current $I_0$ depending on the AC rectangular wave Sg into fluctuations in the voltage (waveform $V_1$ in a dotted line (see FIG. 4)).

In this case, the waveform $V_1$ has amplitude smaller than that of the waveform $V_0$. Consequently, the absolute value $|\Delta V|$ of the voltage difference between the waveform $V_0$ and the waveform $V_1$ varies depending on an effect of an external object, such as a finger, touching or having approached the detection electrode E2 from the outside. The voltage detector DET resets charge and discharge of a capacitor based on the frequency of the AC rectangular wave Sg by switching in the circuit. With the period Reset, the voltage detector DET can accurately detect the absolute value $|\Delta V|$ of the voltage difference.

As described above, the detector 40 compares the absolute value $|\Delta V|$ with the certain threshold voltage, thereby determining whether the external proximity object is not touching or is touching or has approached the display region. The detector 40 thus can perform touch detection based on the basic principle of mutual capacitance touch detection.

A capacitive touch detection method herein is not limited to the mutual-capacitance method described above, and may be the self-capacitance method. In such a case, either the drive electrode E1 or the detection electrode E2 is used in touch detection. The following example describes touch detection using the detection electrode E2. The AC signal source S supplies an AC rectangular wave Sg serving as a drive signal, to the detection electrode E2. The current depending on a capacitance value of the detection electrode E2 flows through the voltage detector DET. The voltage detector DET converts, into fluctuations in voltage, fluctuations in the current depending on the AC rectangular wave Sg.

In the non-touching state, the current depending on a capacitance value of the detection electrode E2 flows. In contrast, in the touching state, a capacitance value generated between a finger and the detection electrode E2 is added to the capacitance value of the detection electrode E2. The detection electrode E2 thus acts as a capacitance element having a larger capacitance value in the touching state than in the non-touching state. The voltage detector DET outputs a detection signal depending on the change in capacitance. Consequently, the detector 40 can perform touch detection based on the absolute value $|\Delta V|$.

Figure 5:
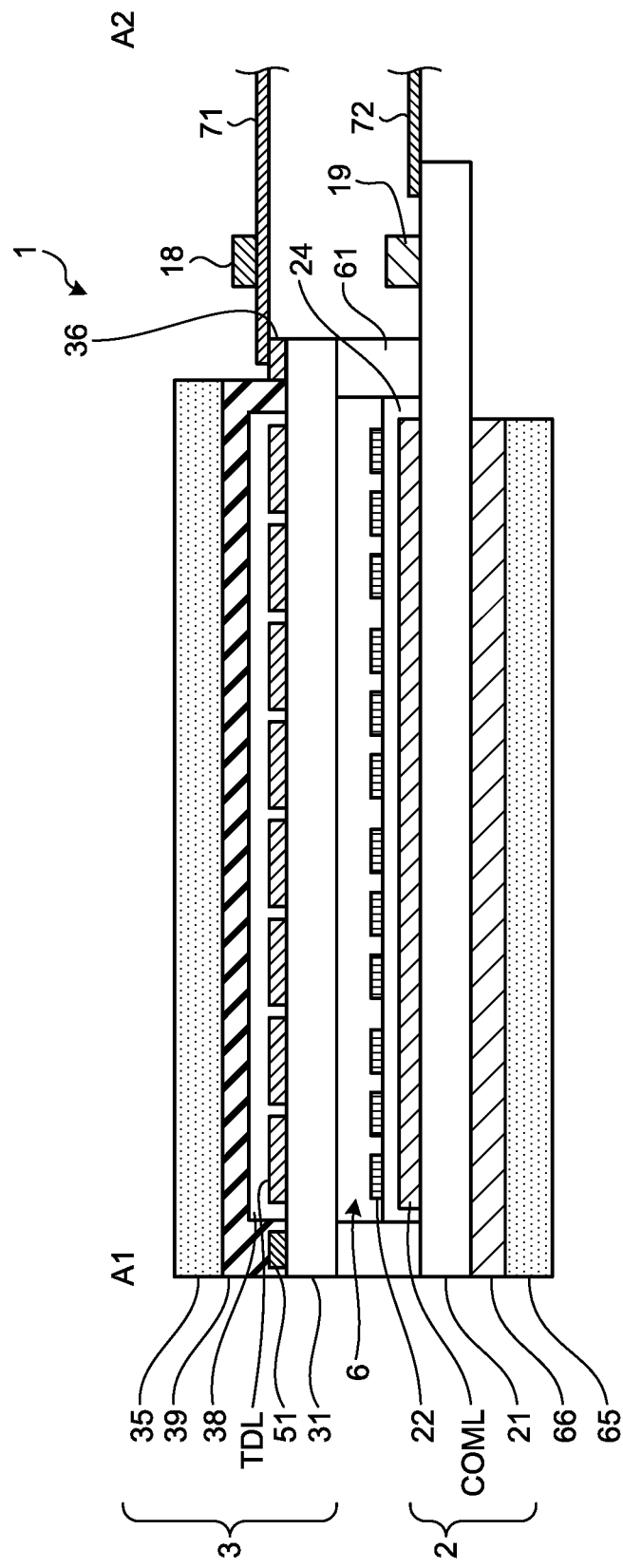
FIG. 5 is a sectional view representing a schematic sectional structure of the display device according to the first embodiment.

Next, an exemplary configuration of the display device 1 of this embodiment is described. FIG. 5 is a sectional view representing a schematic sectional structure of the display device according to the first embodiment. FIG. 5 is a sectional view taken along the V-V line in FIG. 11. As illustrated in FIG. 5, the display device 1 includes a pixel substrate 2, a counter substrate 3, and a liquid crystal layer 6 serving as a display function layer. The counter substrate 3 is disposed facing the pixel substrate 2 in a direction perpendicular to the surface of the pixel substrate 2. The liquid crystal layer 6 is provided between the pixel substrate 2 and the counter substrate 3.

The pixel substrate 2 includes a first substrate 21, pixel electrodes 22, drive electrodes COML, and a polarizing plate 65. The first substrate 21 is provided with circuits such as a gate scanner included in the gate driver 12, switching elements, such as thin film transistors (TFTs), and various kinds of wiring (not illustrated in FIG. 5), such as gate lines GCL and signal lines SGL.

The drive electrodes COML are provided above the first substrate 21. The pixel electrodes 22 are provided above the drive electrodes COML with an insulating layer 24 interposed therebetween. While being provided in a layer different from a layer in which the drive electrodes COML are provided, the pixel electrodes 22 are disposed overlapping the drive electrodes COML in planar view. A plurality of pixel electrodes 22 are disposed in a matrix (row-column configuration) in planar view. The polarizing plate 65 is provided below the first substrate 21 with an adhesive layer 66 interposed therebetween. A light-transmissive conductive material such as indium tin oxide (ITO) is used for the pixel electrodes 22 and the drive electrodes COML. While this embodiment illustrates a case in which the pixel electrodes 22 are provided above the drive electrodes COML, the drive electrodes COML may be provided above the pixel electrodes 22.

A display integrated circuit (IC) 19 and a flexible substrate 72 are provided on the first substrate 21. The display IC 19 functions as the controller 11 illustrated in FIG. 1.

In the present application, "above" refers to a direction from the first substrate 21 toward a second substrate 31 of the direction perpendicular to the surface of the first substrate 21, and "below" refers to a direction from the second substrate 31 toward the first substrate 21. The "planar view" refers to a view seen from a direction perpendicular to a surface of the first substrate 21.

The counter substrate 3 includes: a second substrate 31; a first shielding layer 51 formed on one surface of the second substrate 31; a detection electrode TDL; a protective layer 38; a conductive adhesive layer 39; and a polarizing plate 35. A plurality of detection electrodes TDL are arranged on the second substrate 31. The detection electrodes TDL function as detection electrodes for the touch sensor 30. A color filter 32 (see FIG. 12) is provided on the other surface of the second substrate 31, that is, a surface thereof facing the first substrate 21.

A flexible substrate 71 is coupled to the second substrate 31 via a terminal section 36. A detection IC 18 is mounted on the flexible substrate 71. In this embodiment, each of the first substrate 21 and the second substrate 31 is, for example, a glass substrate or a resin substrate. The detection electrodes TDL are electrically coupled to the detection IC 18 via terminal sections 36. The first shielding layer 51 is provided in the same layer as the detection electrodes TDL. The detailed configurations of the first shielding layer 51 and the detection electrodes TDL are to be described later.

Figure 8:
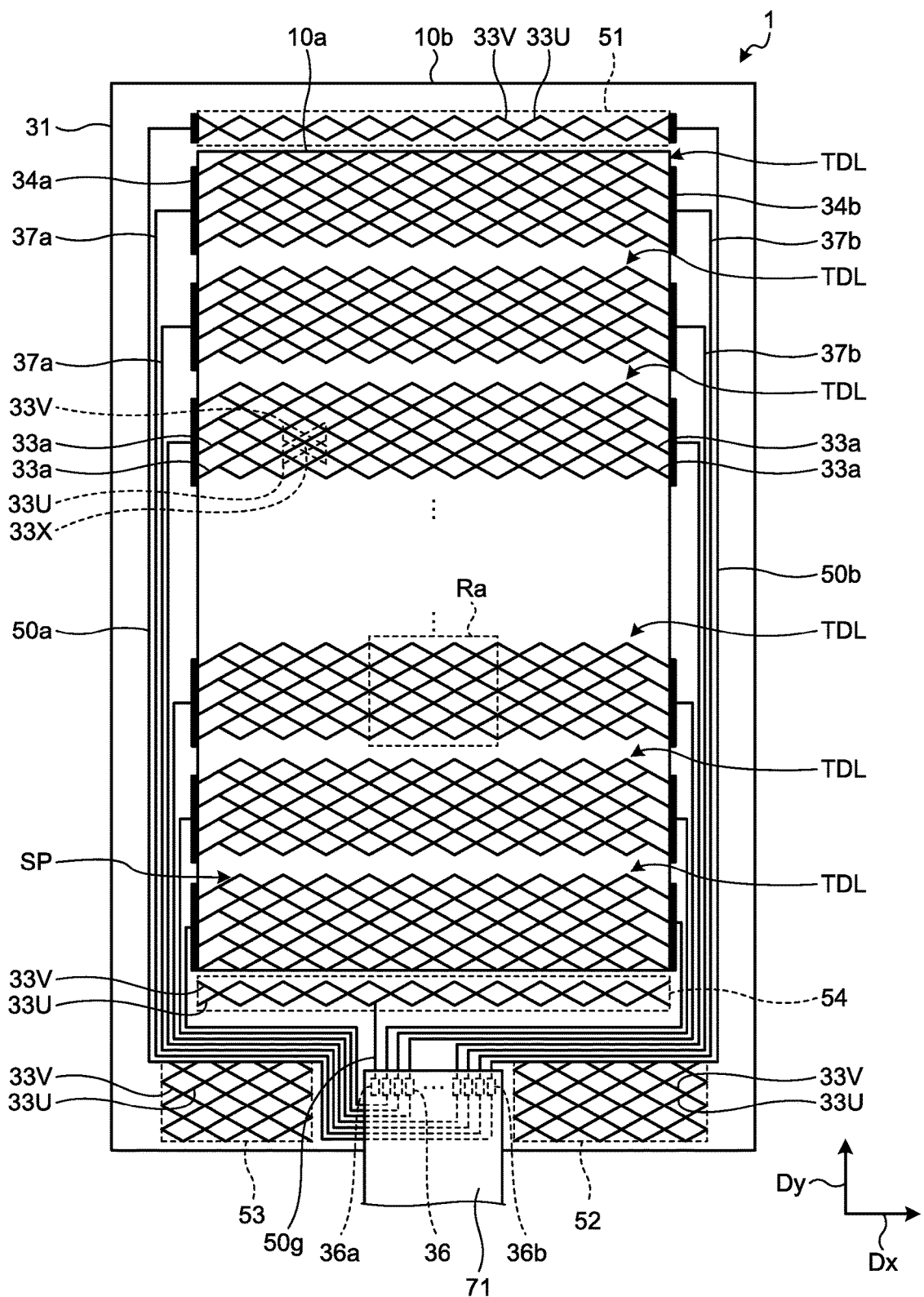
FIG. 8 is a plan view of a second substrate according to the first embodiment.

Each of the detection electrodes TDL includes first conductive thin wires 33U and second conductive thin wires 33V (see FIG. 8). The protective layer 38 for protecting the detection electrodes TDL including the first conductive thin wires 33U and the second conductive thin wires 33V is provided on the detection electrodes TDL. The protective layer 38 is electrically insulative and can be formed of a light-transmissive resin such as an acrylic resin. The protective layer 38 covers the detection electrodes TDL and is not provided on at least a part of the first shielding layer 51.

The polarizing plate 35 is provided above the protective layer 38. The conductive adhesive layer 39 is provided between the polarizing plate 35 and the protective layer 38 in a direction perpendicular to a surface of the second substrate 31. The conductive adhesive layer 39 is in contact with the polarizing plate 35 and in contact with the first shielding layer 51 exposed from the protective layer 38. In planar view, a region within which the conductive adhesive layer 39 is provided is larger than a detection electrode region, which herein refers to a region within which the detection electrodes TDL are provided.

The conductive adhesive layer 39 is provided not only for joining the polarizing plate 35 and the protective layer 38 to each other but also as a preventative measure against electro-static discharge (ESD). The conductive adhesive layer 39 is a light-transmissive conductive layer and contains a light-transmissive resin adhesive agent, and conductive particles. The conductive particles are dispersed within the resin adhesive agent. The sheet resistance of the conductive adhesive layer 39 can be increased by adjustment of the sizes and the amount of the conductive particles contained in the resin adhesive agent and the characteristics, such as conductivity, of the conductive particles. In this embodiment, the sheet resistance of the conductive adhesive layer 39 is higher than the sheet resistance of the first shielding layer 51. As described above, the conductive adhesive layer 39 is in direct contact with the first shielding layer 51, so that static electricity flows from the conductive adhesive layer 39 to the first shielding layer 51. Consequently, static electricity can be more effectively discharged.

The first substrate 21 and the second substrate 31 are disposed facing each other with a certain space interposed therebetween. A space between the first substrate 21 and the second substrate 31 is closed off by a sealing section 61. The liquid crystal layer 6 is provided in a space surrounded by the first substrate 21, the second substrate 31, and the sealing section 61. The liquid crystal layer 6 modulates, in accordance with conditions of electric fields therein, light passing therethrough. For the liquid crystal layer 6, liquid crystal of the transverse electric field mode such as the in-plane switching (IPS) mode is used, examples of which include, but are not limited to, the fringe field switching (FFS) mode. An orientation film is provided between the liquid crystal layer 6 and the pixel substrate 2 and between the liquid crystal layer 6 and the counter substrate 3 in the illustration of FIG. 5. In this embodiment, transverse electric fields generated between the pixel electrodes 22 and the drive electrodes COML drive the liquid crystal layer 6.

An illuminator (backlight) not illustrated is provided below the first substrate 21. The illuminator includes a light source such as a light emitting diode (LED), and outputs light from the light source to the first substrate 21. The light from the illuminator passes through the pixel substrate 2 and is modulated depending on the conditions of liquid crystals at the corresponding position. The state of light is transmission to the display surface varies depending on the positions. Consequently, an image is displayed on the display surface.

Figure 6:
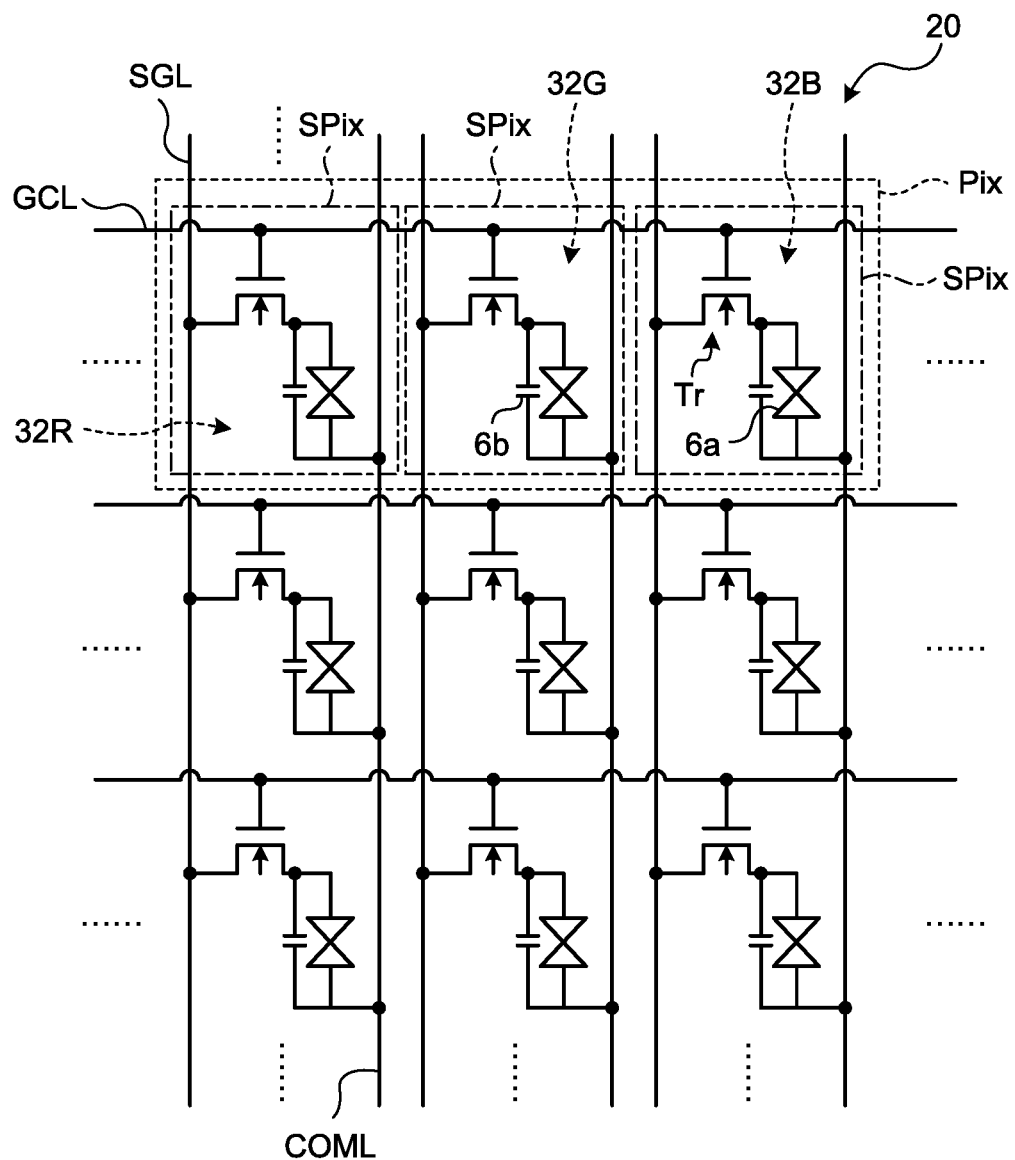
FIG. 6 is a circuit diagram representing a pixel array of a display portion.

The following describes a display operation performed by the display device 1. FIG. 6 is a circuit diagram representing a pixel array in the display portion. The first substrate 21 (see FIG. 5) is provided with switching elements Tr of the respective sub-pixels SPix, the signal lines SGL, the gate lines GCL, and other components, which are illustrated in FIG. 6. The signal lines SGL are wires through which pixel signals Vpix are supplied to the respective pixel electrodes 22. The gate lines GCL are wires through which drive signals for driving the respective switching elements Tr are supplied. The signal lines SGL and the gate lines GCL extend on a plane parallel to the surface of the first substrate 21.

The display portion 20 illustrated in FIG. 6 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal-oxide-semiconductor (MOS) TFT in this example. The insulating layer 24 is provided between the pixel electrodes 22 and the drive electrodes COML to form holding capacitance 6b illustrated in FIG. 6.

The gate driver 12 illustrated in FIG. 1 sequentially selects the gate lines GCL. The gate driver 12 applies the scanning signals Vscan to the gates of the switching elements Tr of the respective sub-pixels SPix through the selected gate line GCL. Consequently, one row (one horizontal line) out of the sub-pixels SPix is sequentially selected as a target of display drive. The source driver 13 supplies the pixel signals Vpix to the selected sub-pixels SPix forming the selected one horizontal line via the signal lines SGL. The sub-pixels SPix perform display in units of one horizontal line based on the supplied pixel signals Vpix.

To perform the display operation, the drive-electrode driver 14 illustrated in FIG. 1 applies the display drive signals Vcomdc to the drive electrodes COML. The display drive signals Vcomdc are DC voltage signals serving as a common potential for the sub-pixels SPix. Consequently, the drive electrodes COML function as common electrodes for the pixel electrodes 22 in the display operation. During the display operation, the drive-electrode driver 14 applies the drive signals Vcomdc to all the drive electrodes COML in a display region 10a.

The color filter 32 (see FIG. 12) may include, for example, periodically arranged color areas of the color filter 32 in three colors of red (R), green (G), and blue (B). Color areas 32R, 32G, and 32B in the three colors of R, G, and B, respectively, serve as a set and correspond to the respective sub-pixels SPix illustrated in FIG. 6 described above. The pixel Pix is composed of a set of sub-pixels SPix corresponding to the respective color areas 32R, 32G, and 32B in the three colors. The color filter 32 may include color areas in four or more colors.

Figure 7:
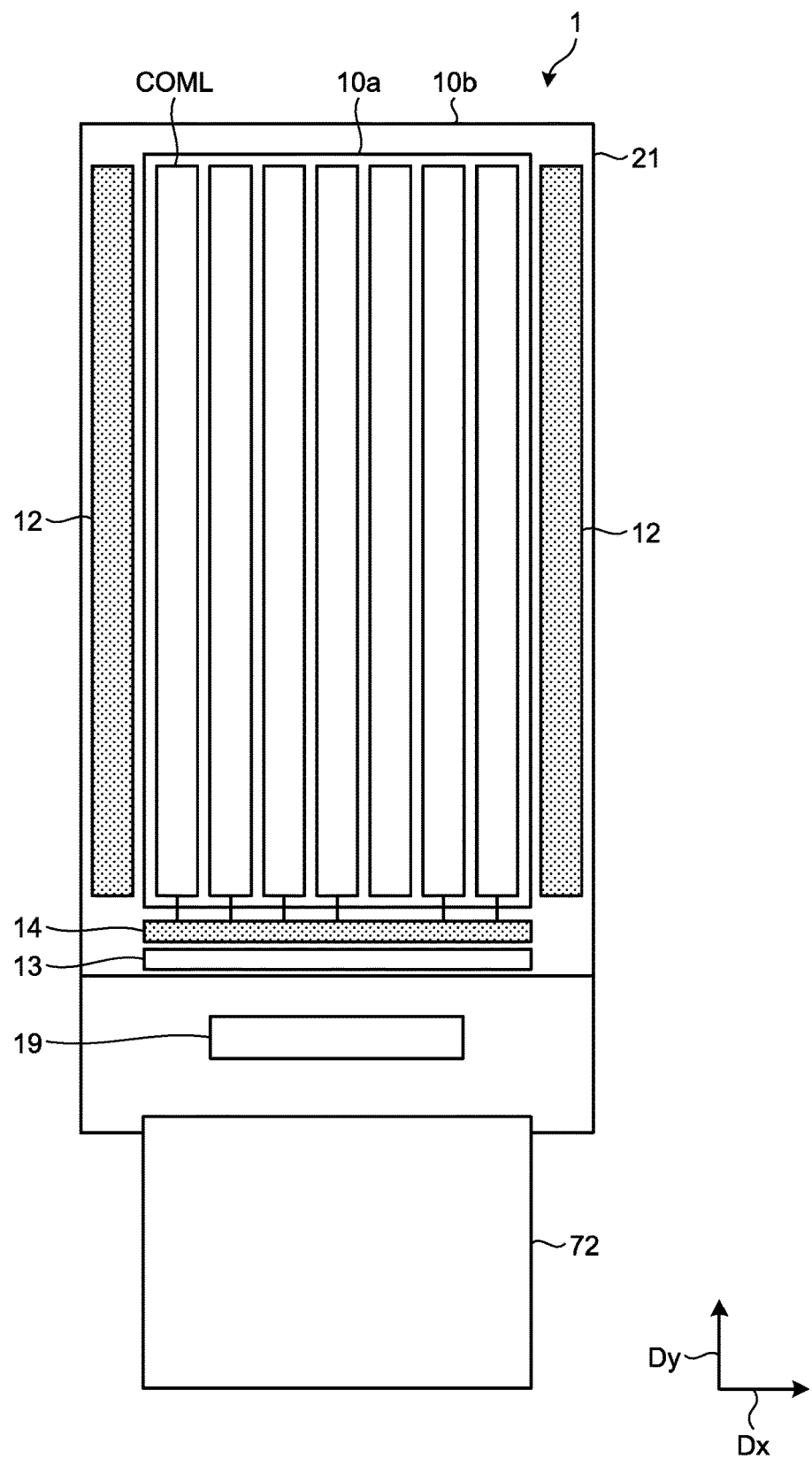
FIG. 7 is a plan view of a first substrate according to the first embodiment.
Figure 9:
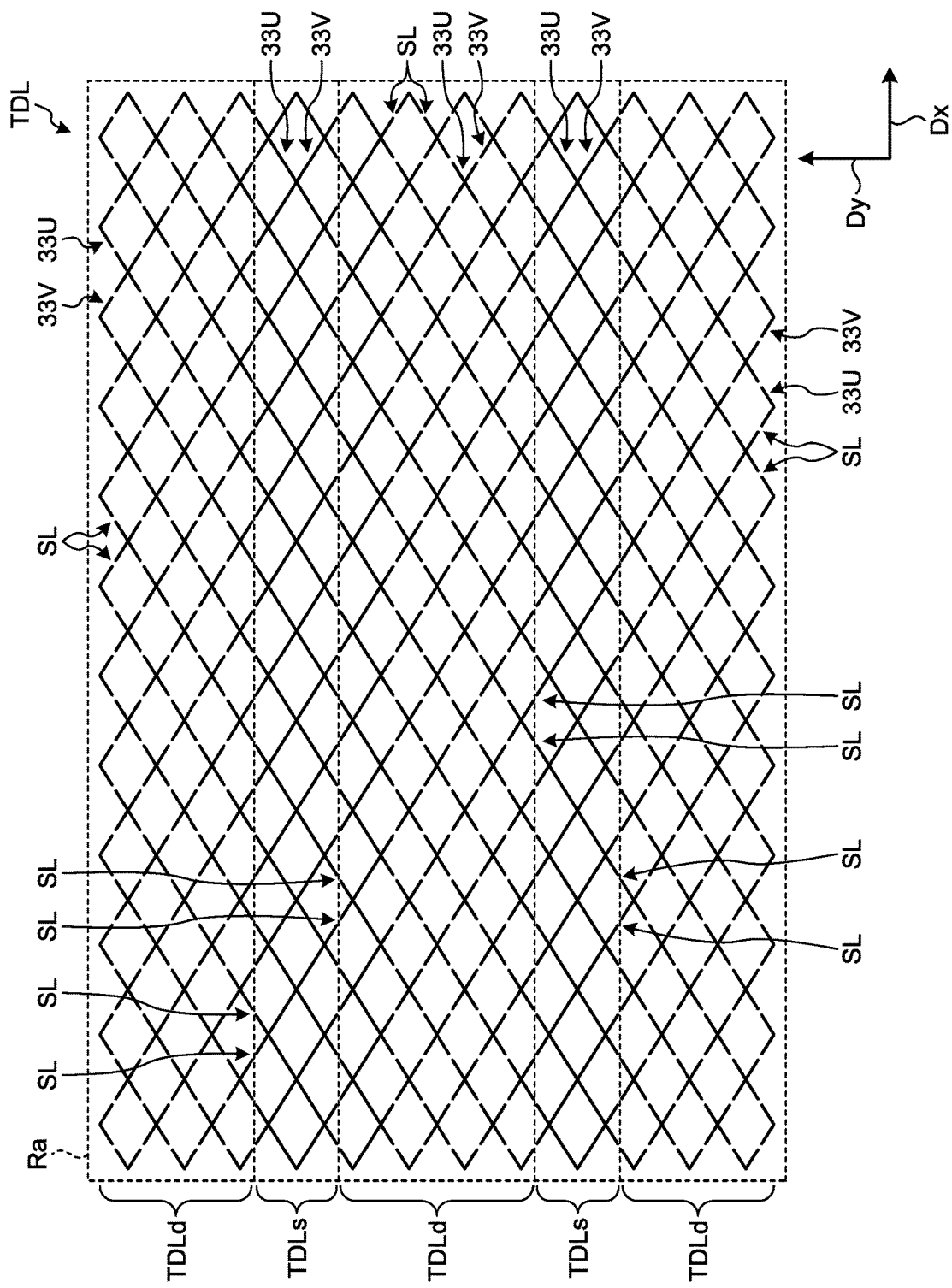
FIG. 9 is a plan view illustrating, in an enlarged manner, the region Ra illustrated in FIG. 8.

The following describes the configuration of the drive electrode COML and the detection electrode TDL and a touch detecting operation. FIG. 7 is a plan view of the first substrate according to the first embodiment. FIG. 8 is a plan view of the second substrate according to the first embodiment. FIG. 9 is a plan view illustrating, in an enlarged manner, the region Ra illustrated in FIG. 8.

As illustrated in FIG. 7, the first substrate 21 is sectioned into regions corresponding to: the display region 10a of the display portion 20 (see FIG. 1); and a peripheral region 10b provided to the outside of the display region 10a. The display IC 19 is mounted on the first substrate 21 in the peripheral region 10b. The display IC 19 is a component in which circuits of functions needed for the display operation are embedded, such as some of the functions of the controller 11, the gate driver 12, and the source driver 13 illustrated in FIG. 1. The peripheral region 10b may surround the display region 10a. In such a case, the peripheral region 10b can be referred to as a frame area instead.

The gate driver 12, the source driver 13, and the drive-electrode driver 14 are formed on the first substrate 21, which is a glass substrate. The display IC 19 and the drive-electrode driver 14 are provided in the peripheral region 10b. The display IC 19 may have the drive-electrode driver 14 embedded therein. In such a case, the peripheral region 10b can be narrowed. The flexible substrate 72 is coupled to the display IC 19, so that video signals Vdisp and a power-supply voltage from the outside are supplied to the display IC 19 via the flexible substrate 72.

As illustrated in FIG. 7, a plurality of drive electrodes COML are provided on the first substrate 21 in the display region 10a. The drive electrodes COML each extend in the second direction Dy and a plurality of drive electrodes COML are arranged in the first direction Dx. In other words, each of the drive electrodes COML extends in a direction along the long edges of the display region 10a, and these drive electrodes COML are arranged side by side in a direction along the short edges of the display region 10a with spaces between adjacent ones of the drive electrodes COML. Each of these drive electrodes COML is coupled to the drive-electrode driver 14.

In this embodiment, the drive electrodes COML extend in the direction intersecting the gate lines GCL. In other words, the drive electrodes COML extend in a direction parallel to the signal lines SGL. Consequently, wires coupled to the drive electrodes COML and the drive-electrode driver 14 can be positioned in a part different from parts in which the gate driver 12 is provided. Specifically, for example, as illustrated in FIG. 7, the gate drivers 12 are provided in parts of the peripheral region 10b that extend along the respective long edges thereof, and the drive-electrode driver 14 and the source driver 13 are provided in a part of the peripheral region 10b, the part extending along one of the short edges thereof and having the flexible substrate 72 coupled thereto. The display device 1 of this embodiment can make the peripheral region 10b along the drive electrodes COML narrower.

As illustrated in FIG. 8, a plurality of detection electrodes TDL are provided on the second substrate 31 in the display region 10a. The detection electrodes TDL each extend in the first direction Dx, and a plurality of detection electrodes TDL are arranged in the second direction Dy with spaces SP between adjacent ones of the detection electrodes TDL. That is, each of the drive electrodes COML and each of the detection electrodes TDL are disposed in a manner intersecting each other in planar view, and a capacitance is generated at the position where the drive electrode COML and the detection electrode TDL overlap each other.

During touch detection, the drive-electrode driver 14 sequentially scans the drive electrodes COML in a time-division manner to sequentially apply drive signals Vcom to the drive electrodes COML. Each of the detection electrodes TDL then outputs, to the touch detector 40, the signal corresponding to a change in capacitance between the corresponding drive electrode COML and the detection electrode TDL. Touch detection on the display region 10a is thus performed. That is, the drive electrode COML corresponds to the drive electrode E1 in the above-described basic principle of mutual capacitance touch detection, and the detection electrode TDL corresponds to the detection electrode E2. The detection electrodes TDL and the drive electrodes COML form capacitive touch sensors in a matrix (row-column configuration) with each of the detection electrodes TDL and each of the drive electrodes COML intersecting each other. Thus, scanning the entirety of a touch detection surface of the touch sensor 30 enables detection of a detected object that is touching or has approached the touch detection surface.

In one exemplary manner of operation of the display device 1, the display device 1 performs the touch detecting operation (touch detection periods) and the display operation (display periods) in a time-division manner. The display device 1 may perform the touch detecting operation and the display operation in any division manner.

The drive-electrode driver 14 may supply the drive signals Vcom for touch detection to the detection electrodes TDL for touch detection when the detection operation is performed only with the drive electrodes TDL without the use of the drive electrodes COML during each touch detection period, that is, for example, when touch detection is performed based on the touch detection principle according to the self-capacitance method.

As illustrated in FIG. 8, each of the detection electrodes TDL of this embodiment includes a plurality of first conductive thin wires 33U and a plurality of second conductive thin wires 33V. Each of the first conductive thin wires 33U and each of the second conductive thin wires 33V slope in opposite directions with respect to a direction parallel to one edge of the display region 10a. The first conductive thin wire 33U and the first direction Dx form a first angle, and the second conductive thin wire 33V and the first direction Dx form a second angle.

Each of the first conductive thin wires 33U and the second conductive thin wires 33V is a metal wire having a narrow width. In the display region 10a, the first conductive thin wires 33U are disposed side by side with spaces between adjacent ones thereof in a direction intersecting a direction in which the first conductive thin wires 33U extend, that is, in the second direction Dy. The second conductive thin wires 33V are also disposed side by side with spaces between adjacent ones thereof in the second direction Dy.

The detection electrode TDL includes at least one such first conductive thin wire 33U and at least one such second conductive thin wire 33V intersecting the first conductive thin wire 33U. The first conductive thin wire 33U and the second conductive thin wire 33V are electrically coupled to each other at a connection part 33X. When the first conductive thin wires 33U intersect the second conductive thin wires 33V, each opening of a mesh thus formed by the detection electrode TDL forms a parallelogram.

The respective ends of the first conductive thin wires 33U and the second conductive thin wires 33V in a direction in which these thin wires extend are coupled to coupling wires 34a and 34b. The first conductive thin wires 33U and the second conductive thin wires 33V, which serve as a main detector of the detection electrode TDL, are coupled to the coupling wires 34a and 34b through thin wires 33a. Each of these first conductive thin wires 33U and each of these second conductive thin wires 33V are electrically coupled to each other, so that these first conductive thin wires 33U and second conductive thin wires 33V together function as one detection electrode TDL.

The first conductive thin wires 33U and the second conductive thin wires 33V are formed from metal layers made of one or more of aluminum (Al), copper (Cu), silver (Ag), molybdenum (Mo), chromium (Cr), titanium (Ti), and tungsten (W). Otherwise, the first conductive thin wires 33U and the second conductive thin wires 33V are formed of an alloy containing at least one metal material of the above metal materials. The first conductive thin wires 33U and the second conductive thin wires 33V may each be a stack composed of a plurality of conductive layers that are made of the above metal materials or alloys containing at least one of these materials. A conductive layer formed of a light-transmissive conductive oxide such as ITO may be stacked on the first conductive thin wires 33U and the second conductive thin wires 33V. Any one of a blackened film, a black organic film, and a black conductive organic film that can each be obtained by combining the at least one metal material described above and a conductive layer may be stacked thereon.

The metal materials described above have resistance lower than a light-transmissive conductive oxide such as ITO. The above-described metal materials have higher light blocking tendency than the light-transmissive conductive oxide, thereby being likely to decrease the transmission or to make the pattern of the detection electrode TDL visible. In this embodiment, one detection electrode TDL includes a plurality of first conductive thin wires 33U having narrow widths and a plurality of second conductive thin wires 33V having narrow widths, and adjacent ones of the first conductive thin wires 33U and of the second conductive thin wires 33V are disposed with spaces therebetween that are each larger than the width of each of these wires. This allows the detection electrodes TDL to have resistance lower than otherwise and to be invisible. As a result, the display device 1 can have a thinner profile, a larger screen, or a higher definition.

Depending on a combination of the at least one metal material described above and the conductive adhesive layer 39 (see FIG. 5), battery reaction or the like occurs, possibly resulting in corrosion of the metal material in the detection electrodes TDL. In this embodiment, however, the protective layer 38 is provided on the detection electrodes TDL, so that the conductive adhesive layer 39 is isolated from the detection electrodes TDL. The metal material in the detection electrodes TDL is thus prevented from corroding.

The first conductive thin wires 33U and the second conductive thin wires 33V each preferably have a width within the range of 1 µm to 10 µm, and more preferably have a width within the range of 1 µm to 5 µm. When the first conductive thin wires 33U and the second conductive thin wires 33V each have a width of 10 µm or less, the aperture ratio is less likely to be decreased, because a total area overlapping the apertures corresponding to regions enclosed by the black matrix in the display region 10a becomes small. When the respective widths of the first conductive thin wires 33U and the second conductive thin wires 33V are 1 µm or more, breakage of the wires is less likely because the shapes thereof is stable.

As illustrated in FIG. 8, each of the detection electrodes TDL includes these first conductive thin wires 33U and second conductive thin wires 33V disposed at certain pitches. The detection electrode TDL as a whole extends in a direction intersecting a direction (the second direction Dy) in which the color regions 32R, the color regions 32G, and the color regions 32B (see FIG. 6) of the color filter 32 each extend. That is, the detection electrode TDL extends in the first direction Dx intersecting the signal lines SGL illustrated in FIG. 6. With each of the first conductive thin wires 33U and each the second conductive thin wires 33V slope in opposite directions and intersect each other, the first conductive thin wires 33U and the second conductive thin wires 33V form a mesh-like pattern. Consequently, the first conductive thin wires 33U and the second conductive thin wires 33V are prevented from blocking light that passes through the color regions in any particular color of the color filter 32. Each of the first conductive thin wires 33U and each of the second conductive thin wires 33V slope in opposite directions at an angle θ with respect to the direction in which the color regions 32R, the color regions 32G, and the color regions 32B each extend. For example, the angle θ is within the range of 5 to 75 degrees, preferably within the range of 25 to 40 degrees, and more preferably within the range of 50 to 65 degrees.

Directions in which each of the first conductive thin wires 33U and each of the second conductive thin wires 33V extend thus form angles with respect to the direction in which the color regions 32R, the color regions 32G, and the color regions 32B of the color filter 32 each extend. As a result, the first conductive thin wires 33U and the second conductive thin wires 33V sequentially block light through the individual color regions 32R, the individual color regions 32G, and the individual color regions 32B of the color filter 32, so that the transmission can be prevented from being lower in any particular one of the color regions of the color filter 32. The first conductive thin wires 33U and the second conductive thin wires 33V may be arranged in an irregular fashion to a preferable extent. That is, spaces between adjacent ones of the first conductive thin wires 33U may be varied, and spaces between adjacent ones of the second conductive thin wires 33V may be varied.

FIG. 9 is an enlarged view of a part in FIG. 8. As illustrated in FIG. 9, the detection electrode TDL includes sensor sections TDLs and dummy sections TDLd. The sensor sections TDLs and the dummy sections TDLd each extend in the first direction Dx, and are alternately disposed in the second direction Dy. The sensor sections TDLs are coupled to the coupling wires 34a and 34b illustrated in FIG. 8, and mainly function as detection electrodes. The dummy sections TDLd are provided in a manner electrically isolated from the sensor sections TDLs and the coupling wires 34a and 34b. The dummy sections TDLd are dummy electrodes, which do not function as detection electrodes.

The sensor sections TDLs and the dummy sections TDLd each include the first conductive thin wires 33U and the second conductive thin wires 33V, and are formed in respective mesh-like structures similar to each other. The display region 10a provides favorable visibility because the light transmittance thereof is thus prevented from being varied. The sensor sections TDLs are electrically isolated from the dummy sections TDLd with slits SL provided in the first conductive thin wires 33U and the second conductive thin wire 33V. Slits SL are provided in the first conductive thin wires 33U and the second conductive thin wires 33V that form each mesh opening of the dummy sections TDLd. During touch detection, this configuration brings the dummy sections TDLd into a floating state in which voltage signals are not supplied.

The rate of covering with the detection electrodes TDL (the occupancy thereof per unit area) is preferably 10% or less. When the rate of covering with the detection electrodes TDL is too high, the transmission is so low that display appears dark or that the backlight consumes more power. A distance between adjacent electrodes is preferably 300 μm or less. When the distance between each adjacent ones of the electrodes is large, it is necessary to provide a conductive layer 59 (see FIG. 18) and to lower the resistance of the conductive layer 59 so as to lower the resistance between the electrodes. Lowering the resistance of the conductive layer 59 weakens touch signals.

As illustrated in FIG. 8, first wires 37a are coupled to the respective coupling wires 34a. Second wires 37b are coupled to the respective coupling wires 34b. That is, in this embodiment, one of the first wires 37a is coupled to the one end of each of the detection electrodes TDL, and one of the second wires 37b is coupled to the other end thereof. The first wires 37a are provided along one of the long edges of the peripheral region 10b. The second wires 37b are provided along the other long edge of the peripheral region 10b.

One of the first wires 37a and one of the second wires 37b that are coupled to the same detection electrode TDL are coupled to the same terminal section 36. That is, the detection electrode TDL, the first wire 37a, the second wire 37b, and the terminal section 36 are coupled to one another in a loop. The detection electrode TDL is coupled to the flexible substrate 71 via the first wire 37a, the second wire 37b, and the terminal section 36.

The first wires 37a and the second wires 37b are formed of a material that is the same as the at least one metal material, the alloy, or the like that the first conductive thin wires 33U and the second conductive thin wires 33V are formed of. Any material having favorable conductivity can be used for the first wires 37a and the second wires 37b, and a material different from that for the first conductive thin wires 33U and the second conductive thin wires 33V may be used therefor.

One of the first wires 37a and one of the second wires 37b are thus coupled to the same detection electrode TDL, so that, even when one of the first wire 37a and the second wire 37b is cut off, the other maintains the coupling between the detection electrode TDL and the flexible substrate 71. Therefore, the display device 1 of this embodiment can have the detection electrode TDL and the flexible substrate 71 more reliably coupled to each other.

A configuration such that one of the first wires 37a or one of the second wire 37b only is coupled to each one of the detection electrodes TDL may be employed. Each of the detection electrodes TDL is not limited to being composed of metal thin wires formed in a mesh-like pattern, and may be formed of, for example, a plurality of metal thin wires formed in zigzag lines, in wavy lines, or in straight lines. While FIG. 9 illustrates the sensor sections TDLs and the dummy sections TDLd included in one of the detection electrodes TDL, a dummy electrode may be disposed in a space SP between each adjacent ones of the detection electrodes TDL.

As illustrated in FIG. 8, the first shielding layer 51, a second shielding layer 52, a third shielding layer 53, and a fourth shielding layer 54 are provided in the peripheral region 10b of the second substrate 31. The first shielding layer 51, the second shielding layer 52, the third shielding layer 53, and the fourth shielding layer 54 each include first conductive thin wires 33U and second conductive thin wires 33V and are formed in respective mesh-like structures similar to the detection electrodes TDL. Each of the first shielding layer 51, the second shielding layer 52, the third shielding layer 53, and the fourth shielding layer 54 is not limited to this example, and may be formed of, for example, a plurality of metal thin wires formed in zigzag lines, in wavy lines, or in straight lines, or may be a seamless conductive film. Each of the first shielding layer 51, the second shielding layer 52, the third shielding layer 53, and the fourth shielding layer 54 is formed from metal layers made of one or more of aluminum (Al), copper (Cu), silver (Ag), molybdenum (Mo), chromium (Cr), titanium (Ti), and tungsten (W); and a layer of an alloy containing at least one metal material of the above metal materials.

As illustrated in FIG. 8, the terminal sections 36, 36a, and 36b to which the flexible substrate 71 is coupled are provided in a part of the peripheral region 10b, the part extending along one of the two edges thereof that face each other in the second direction Dy. The first shielding layer 51 is provided in a part of the peripheral region 10b, the part extending along the other edge of the two edges thereof that face each other in the second direction Dy. That is, the first shielding layer 51 is provided in a part of the peripheral region 10b, the part extending along an edge thereof opposite across the display region 10a to another edge thereof along which the part having the terminal sections 36, 36a, and 36b extends. The second shielding layer 52, the third shielding layer 53, and the fourth shielding layer 54 are provided in a part of the peripheral region 10b, the part extending along the one edge thereof, that is, in a part of the peripheral region 10b, the part being opposite across the display region 10a to a part thereof having the first shielding layer 51.

The first shielding layer 51 as a whole extends in the first direction Dx, and is provided along the detection electrodes TDL. A wire 50a is coupled to one end of the first shielding layer 51, and a wire 50b is coupled to the other end thereof. The wire 50a is provided along one of the long edges of the peripheral region 10b. The wire 50b is provided along the other long edge of the peripheral region 10b. The respective wires 50a and 50b are provided outside the first wires 37a and the second wires 37b that are coupled to the detection electrodes TDL. The wires 50a and 50b are coupled to the same terminal section 36b. As a result of this configuration, the first shielding layer 51, the wires 50a and 50b, and the terminal section 36b are coupled to one another in a loop. The first shielding layer 51 is coupled to the flexible substrate 71 via the wires 50a and 50b, and the terminal section 36b.

The second shielding layer 52 and the third shielding layer 53 are provided in a part of the peripheral region 10b, the part having the flexible substrate 71 coupled thereto. The second shielding layer 52 and the third shielding layer 53 face each other in the first direction Dx. The flexible substrate 71 is provided between the second shielding layer 52 and the third shielding layer 53. The second shielding layer 52 and the third shielding layer 53 are provided outside the wires 50a and 50b.

The second shielding layer 52 is electrically coupled to the wire 50b, and is coupled to the flexible substrate 71 via the wire 50b and the terminal section 36b. The third shielding layer 53 is electrically coupled to the wire 50a, and is coupled to the flexible substrate 71 via the wire 50a and the terminal section 36b. In the example illustrated in FIG. 8, the first shielding layer 51, the second shielding layer 52, and the third shielding layer 53 are electrically coupled to the same one terminal section 36b.

The fourth shielding layer 54 is provided between the flexible substrate 71 and the detection electrodes TDL in a part of the peripheral region 10b, the part having the flexible substrate 71 coupled thereto. The fourth shielding layer 54 as a whole extends in the first direction DX and is provided along the detection electrodes TDL. The fourth shielding layer 54 is provided in a region surrounded by the detection electrodes TDL, the first wires 37a, and the second wires 37b. The fourth shielding layer 54 is coupled to a terminal section 36a via a wire 50g. The fourth shielding layer 54 is thereby coupled to the flexible substrate 71.

Voltage signals having the same potential as a potential supplied to the detection electrodes TDL are supplied to the first shielding layer 51, the second shielding layer 52, the third shielding layer 53, and the fourth shielding layer 54. This reduces parasitic capacitances in the detection electrodes TDL and can prevent the detection sensitivity from being reduced. Alternatively, the first shielding layer 51, the second shielding layer 52, the third shielding layer 53, and the fourth shielding layer 54 may be grounded via the flexible substrate 71.

Figure 10:
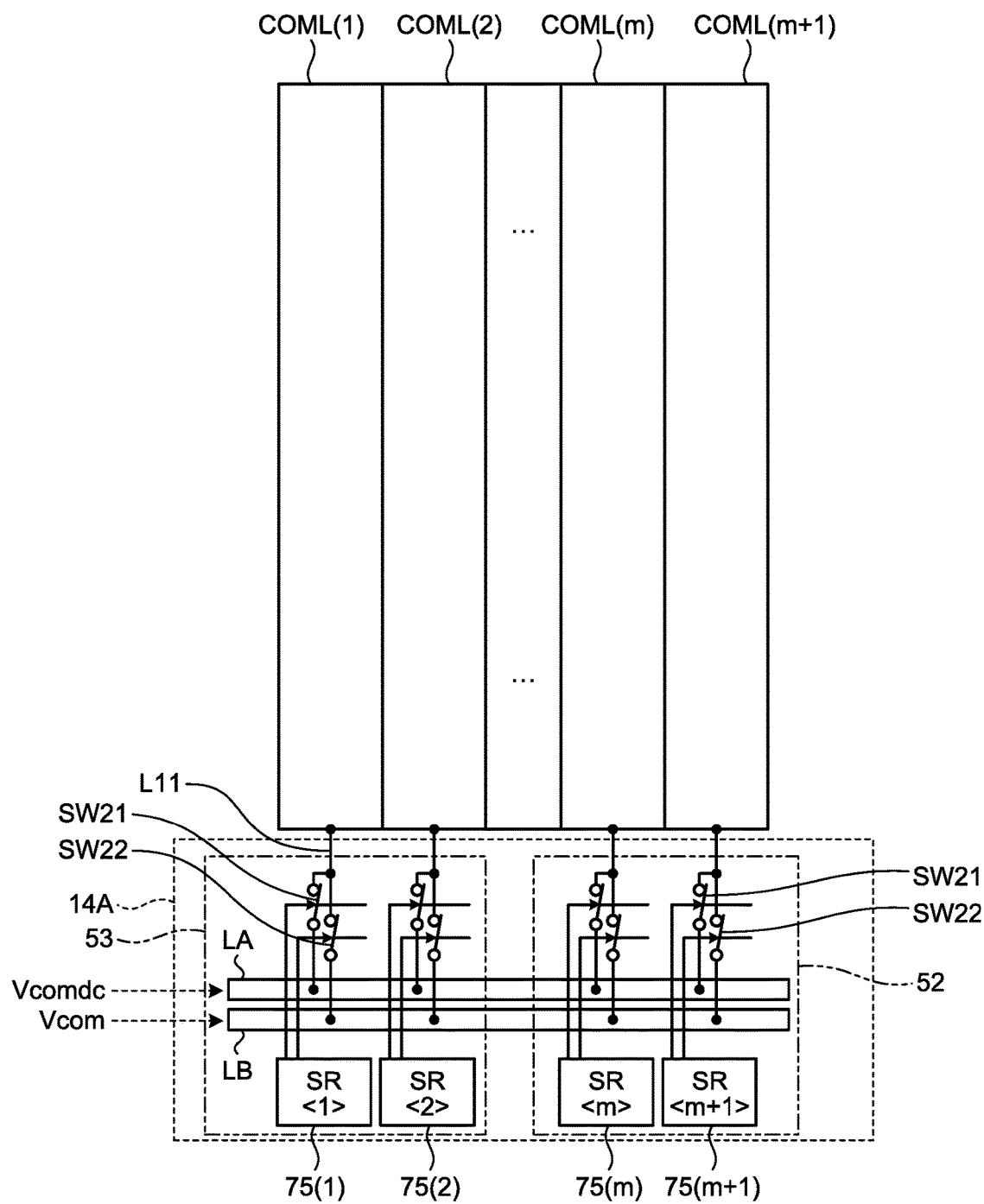
FIG. 10 is a circuit diagram illustrating an example of a drive circuit according to the first embodiment.

FIG. 10 is a circuit diagram illustrating an example of a drive circuit according to the first embodiment. A drive circuit 14A illustrated in FIG. 10 is a scanner circuit included in the drive-electrode driver 14 illustrated in FIG. 7, and sequentially scans the drive electrodes COML. The drive circuit 14A is provided, on the first substrate 21 in the peripheral region 10b, facing the end portions of the respective drive electrodes COML.

As illustrated in FIG. 10, the drive electrodes COML (1), and COML (2), . . . , COML (m), and COML (m+1) are arranged side by side. The drive circuit 14A includes switches SW21 and SW22, wires LA and LB, and shift registers 75(1), 75(2), . . . , 75(*m*), and 75(*m*+1). The respective shift registers 75(1), 75(2), . . . , 75(*m*), and 75(*m*+1) are provided corresponding to the drive electrodes COML (1), and COML (2), . . . , COML (m), and COML (m+1).

The following description uses the term "drive electrode COML" when there is no need to distinguish between the drive electrodes COML (1), and COML (2), . . . , COML (m), and COML (m+1). Likewise, the following description uses the term "shift register 75" when there is no need to distinguish between the shift registers 75(1), 75(2), . . . , 75(*m*), and 75(*m*+1).

Respective switches SW21 and respective switches SW22 are coupled to the drive electrodes COML (1), COML (2), . . . , COML (m), and COML (m+1). One end of each of the switches SW21 is coupled to the corresponding drive electrode COML through a corresponding wire L11. The other end of the switch SW21 is coupled to the wire LA. One end of each of the switches SW22 is coupled to the corresponding drive electrode COML through a corresponding wire L11. The other end of the switch SW22 is coupled to the wire LB. Operation of the switches SW21 and the switches SW22 is controlled by scanning signals supplied from the shift registers 75.

Each of the switches SW21 and the corresponding switch SW22 operate in reverse manners. For example, when the same scanning signal is provided to the switch SW21 and the switch SW22, the switch SW22 is turned off if the switch SW21 is turned on, and the switch SW22 is turned on if the switch SW21 is turned off.

The wire LA and the wire LB are disposed facing the respective ends of the drive electrode COML and extend in a direction intersecting each of the drive electrodes COML. Display drive signals Vcomdc are supplied to the drive electrodes COML via the wire LA. Detection drive signals Vcom are supplied to the drive electrodes COML via the wire LB.

In touch detection, the shift registers 75(1), 75(2), . . . , 75(*m*), and 75(*m*+1) start scanning in response to scanning-start signals from the controller 11. The shift registers 75(1), 75(2), . . . , 75(*m*), and 75(*m*+1) sequentially supply the scanning signals in synchronization with clock signals from the controller 11.

Each of the switches SW21 is turned off and the corresponding switch SW22 is turned on, in response to a scanning signal supplied from the corresponding shift register 75. Consequently, a drive signal Vcom is supplied via the wire LB and the switch SW22 to the drive electrode COML that is to be driven. In contrast, each of the switches SW21 is turned on and the corresponding switch SW22 is turned off, if there is no scanning signal supplied. Consequently, a drive signal Vcomdc, which is a DC voltage signal, is supplied via the wire LA and the switch SW21 to an unselected one of the drive electrodes COML that is not selected to be driven.

As illustrated in FIG. 10, each of the second shielding layer 52 and the third shielding layer 53 is disposed overlapping a part of the drive circuit 14A in planar view. Each of the second shielding layer 52 and the third shielding layer 53 is disposed overlapping at least the wires LA and LB. Consequently, the second shielding layer 52 and the third shielding layer 53 can electrically shield the detection electrodes TDL, the first wires 37a, and the second wires 37b (see FIG. 8) from the wires LA and LB, the switches SW21 and SW22, and the like. Consequently, noise generated from the drive circuit 14A can be prevented from deteriorating the detection performance.

Figure 11:
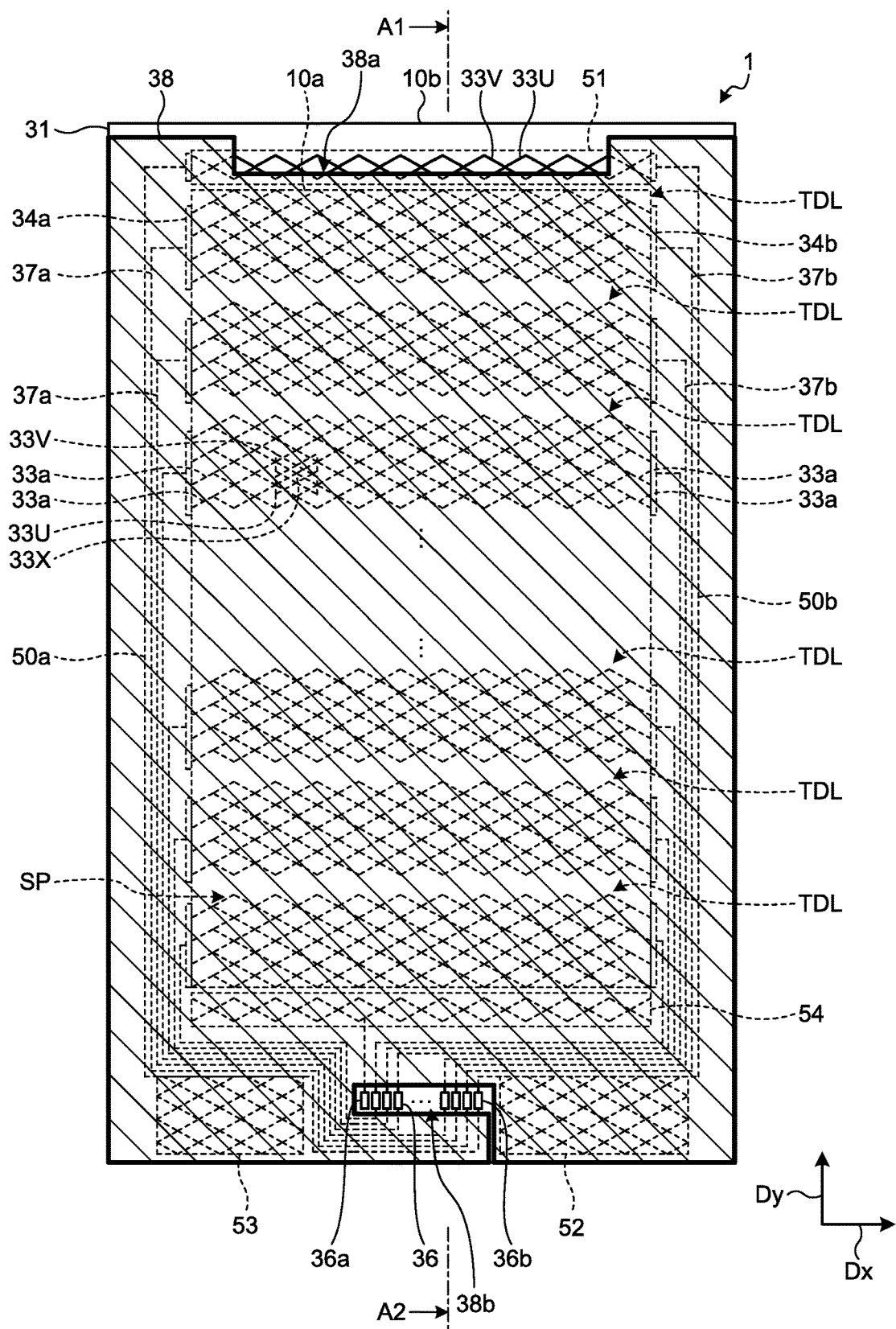
FIG. 11 is a plan view illustrating a protective layer according to the first embodiment.

FIG. 11 is a plan view illustrating the protective layer according to the first embodiment. FIG. 11 illustrates the protective layer 38 with hatching and the outer perimeter thereof with a bold line. As illustrated in FIG. 11, the protective layer 38 is provided on almost the entire surface of the second substrate 31. The protective layer 38 is provided overlapping at least: the entireties of the detection electrodes TDL; the first wires 37a; and the second wires 37b. The first conductive thin wire 33U and second conductive thin wires 33v of the detection electrodes TDL are thus prevented from corroding.

If the protective layer 38 is not provided, an acid component and an ionic substance contained in the conductive adhesive layer 39 (see FIG. 5) are to be eluted, possibly causing quality change or corrosion of the first conductive thin wires 33U and the second conductive thin wires 33V. In this embodiment, the protective layer 38 is provided between the detection electrodes TDL and the conductive adhesive layer 39. Consequently, no ionic substance is to be eluted to the first conductive thin wires 33U and the second conductive thin wires 33V, and quality change and corrosion of the first conductive thin wires 33U and the second conductive thin wires 33V of the detection electrodes TDL can be prevented.

As illustrated in FIG. 11, the protective layer 38 is provided overlapping the second shielding layer 52, the third shielding layer 53, and the fourth shielding layer 54. The protective layer 38 has a recessed portion 38a and an opening 38b. The recessed portion 38a is a portion along a part of one edge of the protective layer 38, the portion being recessed toward the display region 10a from the peripheral region 10b in planar view. The recessed portion 38a is formed in a region overlapping the first shielding layer 51.

In this embodiment, the first shielding layer 51 has some part overlapping the protective layer 38 and the other part not overlapping the protective layer 38. In other words, a part of the first shielding layer 51 is exposed form the protective layer 38. The conductive adhesive layer 39 (see FIG. 5) is provided on the entire surface of the protective layer 38. The conductive adhesive layer 39 is in direct contact with the first conductive thin wires 33U and the second conductive thin wires 33V of the first shielding layer 51 through the recessed portion 38a of the protective layer 38. In other words, the conductive adhesive layer 39 is in contact with a part of the first shielding layer 51 in one side of the peripheral region 10b opposite across the display region 10a to the side thereof having the flexible substrate 71, the part not overlapping the protective layer 38.

This is not a limiting example, and the protective layer 38 may be provided in a position not overlapping the first shielding layer 51. That is, the entire region of the first shielding layer 51 may be exposed from the protective layer 38. In such a case, the contact area between the first shielding layer 51 and the conductive adhesive layer 39 is larger.

The opening 38b is formed in a position overlapping the terminal sections 36, 36a, and 36b. The terminal sections 36, 36a, and 36b are exposed from the protective layer 38 to be coupled to the flexible substrate 71 through the opening 38b.

Figure 12:
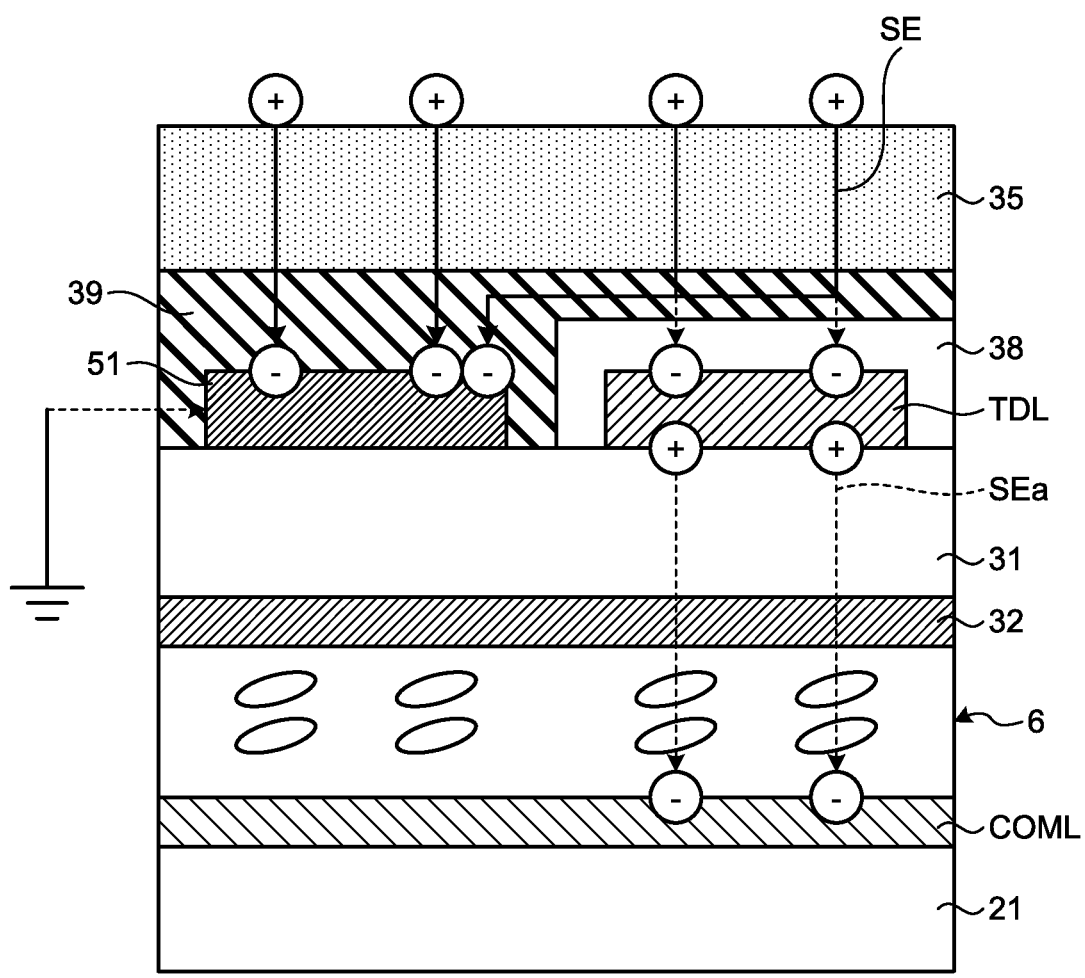
FIG. 12 is an explanatory diagram for schematically explaining flows of static electricity.

FIG. 12 is an explanatory diagram for schematically explaining flows of static electricity. FIG. 12 is a sectional view illustrating, in an enlarged manner, the first shielding layer 51 and one of the detection electrodes TDL that faces the first shielding layer 51.

As described above, the conductive adhesive layer 39 is provided as a preventative measure against ESD that may occur during manufacture and use of the display device 1.

During the manufacture, the polarizing plate 35 is likely to be charged, for example, when the polarizing plate 35 is bonded or a cover substrate (not illustrated) is bonded on the polarizing plate 35, and when a cover film is removed from the polarizing plate 35 or the cover substrate. The polarizing plate 35 is likely to be charged also when a finger of a person touches the touch detection surface (a surface of the cover substrate) during inspection. During the use, the polarizing plate 35 is likely to be charged when a charged finger of a user touches the touch detection surface.

If the conductive adhesive layer 39 is not provided, the polarizing plate 35 is likely to be charged when electromagnetic noise such as static electricity is applied from the outside. Because the first conductive thin wires 33U and the second conductive thin wires 33V (see FIG. 8) have low resistance and narrow widths, it is difficult to remove electric charges carried by the first conductive thin wires 33U and the second conductive thin wires 33V. Because each of the dummy sections TDLd (see FIG. 9) is in a floating state, that is, a state decoupled from the sensor sections TDL and various wires, it is difficult to remove an electric charge carried by the dummy section TDLd. Consequently, orientations in the liquid crystal layer 6 are changed by static electricity carried by the polarizing plate 35 and/or the dummy sections TDLd, and such change possibly degrades the display quality of the display portion 20. The detection signals Vdet1 are changed by such static electricity, and such change possibly degrades the touch detection accuracy of the touch sensor 30.

In this embodiment, as illustrated in FIG. 12, the first shielding layer 51 and the detection electrodes TDL are provided on the second substrate 31. The conductive adhesive layer 39 is provided in almost the entire region within which the second substrate 31 and the polarizing plate 35 overlap each other. The conductive adhesive layer 39 is provided between the polarizing plate 35 and the first shielding layer 51 in a direction perpendicular to a surface of the second substrate 31, and is in direct contact with the polarizing plate 35 and the first shielding layer 51. The conductive adhesive layer 39 is provided between the polarizing plate 35 and the protective layer 38 in a direction perpendicular to a surface of the second substrate 31, and not in contact with the detection electrodes TDL.

As illustrated in FIG. 12, when static electricity SE is applied to the surface of polarizing plate 35 from the outside, the static electricity SE flows to the conductive adhesive layer 39 through the polarizing plate 35. The static electricity SE that has flowed to the conductive adhesive layer 39 then flows to the first shielding layer 51. The conductive adhesive layer 39 is thus provided in direct contact with the polarizing plate 35 and the first shielding layer 51. Consequently, the polarizing plate 35 can be prevented from being charged.

The static electricity SE that has flowed to the first shielding layer 51 then flows to a power supply and the ground potential (GND) through a resistive element included in the touch detector 40 and through an ESD-protection circuit (not illustrated), that is, is discharged. The first shielding layer 51 may be grounded to, for example, a housing of the display device 1.

The protective layer 38 is provided between the detection electrodes TDL and the conductive adhesive layer 39. The protective layer 38 has a higher sheet resistance than the first shielding layer 51, and thereby can prevent the static electricity SE from flowing to the detection electrodes TDL. Consequently, the dummy sections TDLd (see FIG. 9) included in the detection electrodes TDL are prevented from being charged, and static electricity SEa that otherwise flows from the detection electrodes TDL to the drive electrodes COML through the liquid crystal layer 6 can be prevented from thus flowing.

This configuration enables the display device 1 of this embodiment to prevent the polarizing plate 35 and the detection electrodes TDL from being charged. This configuration can thus prevent the static electricity SE from degrading the display quality and reducing the touch detection accuracy. Therefore, the display device 1 of this embodiment can be made more resistant to electromagnetic noise such as static electricity.

The conductive adhesive layer 39 has a sheet resistance, for example, within the range of $10^8$ to $10^{14}$ ohms per square. More preferably, the conductive adhesive layer 39 has a sheet resistance, for example, within the range of $10^9$ to $10^{13}$ ohms per square. The sheet resistance of the conductive adhesive layer 39 is lower than the resistance of the polarizing plate 35. The sheet resistance of the conductive adhesive layer 39 is higher than the sheet resistances of the first conductive thin wires 33U and the second conductive thin wires 33V. That is, the conductive adhesive layer 39 has a higher sheet resistance than the sheet resistances of the first shielding layer 51 and the detection electrodes TDL.

If the conductive adhesive layer 39 has a sheet resistance lower than $10^8$ ohms per square, the conductive adhesive layer 39 is likely to function as a shield and deteriorate the touch detection performance. If the conductive adhesive layer 39 has a sheet resistance higher than $10^{14}$ ohms per square, the static electricity SE is likely to be impeded from favorably flowing to the first shielding layer 51.

Because the sheet resistance of the conductive adhesive layer 39 is lower than the resistance of the polarizing plate 35, the static electricity SE favorably flows through the conductive adhesive layer 39. The sheet resistance of the conductive adhesive layer 39 is higher than each of the sheet resistances of the first conductive thin wires 33U and the second conductive thin wires 33V, so that the conductive adhesive layer 39 does not function as a shield and does not deteriorate the touch detection performance With the sheet resistance within the above range, the static electricity SE flows to the conductive adhesive layer 39 from the polarizing plate 35, and the static electricity can be quickly discharged. Furthermore, the detection electrodes TDL can be prevented from being charged.

The term "sheet resistance" herein means a value of resistance that a resistive element having a square shape in planar view has between two opposite edges thereof. The sheet resistance of the first shielding layer 51 can be measured by a well-known technique called four-terminal sensing, for example, by using conductive layers deposited on the second substrate 31 by sputtering or the like.

As described above, the display device 1 of this embodiment includes: the second substrate 31; the detection electrodes TDL that are provided, in the display region 10a, on a plane parallel to the second substrate 31 and each include a plurality of metal wires (the first conductive thin wires 33U and the second conductive thin wires 33V); a first conductive layer (the first shielding layer 51) provided on the peripheral region 10b outside the display region 10a; the protective layer 38 provided on the detection electrodes TDL; the polarizing plate 35 provided above the protective layer 38; and a second conductive layer (the conductive adhesive layer 39) provided between the polarizing plate 35 and the protective layer 38 in a direction perpendicular to the second substrate 31. The conductive adhesive layer 39 has a higher sheet resistance than the metal wires and is in contact with the first shielding layer 51.

The display device 1 of this embodiment has the conductive adhesive layer 39 provided in contact with the first shielding layer 51. Consequently, the static electricity SE flows from the polarizing plate 35 to the first shielding layer 51 through the conductive adhesive layer 39. Consequently, the polarizing plate 35 can be prevented from being charged. Because the static electricity SE flows to the first shielding layer 51, the detection electrodes TDL as well can be prevented from being charged. As described above, the display device 1 of this embodiment can prevent the static electricity SE from degrading the display quality and reducing the touch detection accuracy.

Second Embodiment

Figure 13:
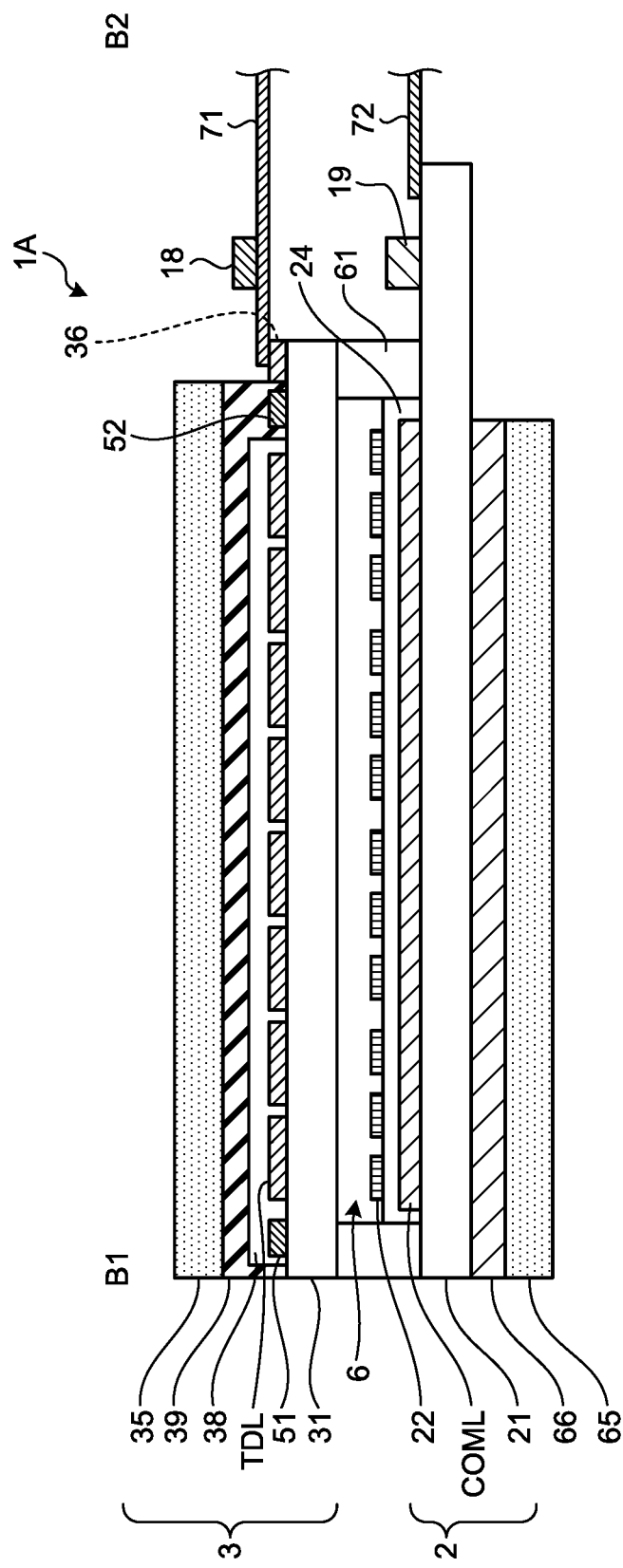
FIG. 13 is a sectional view representing a schematic sectional structure of a display device according to a second embodiment.
Figure 14:
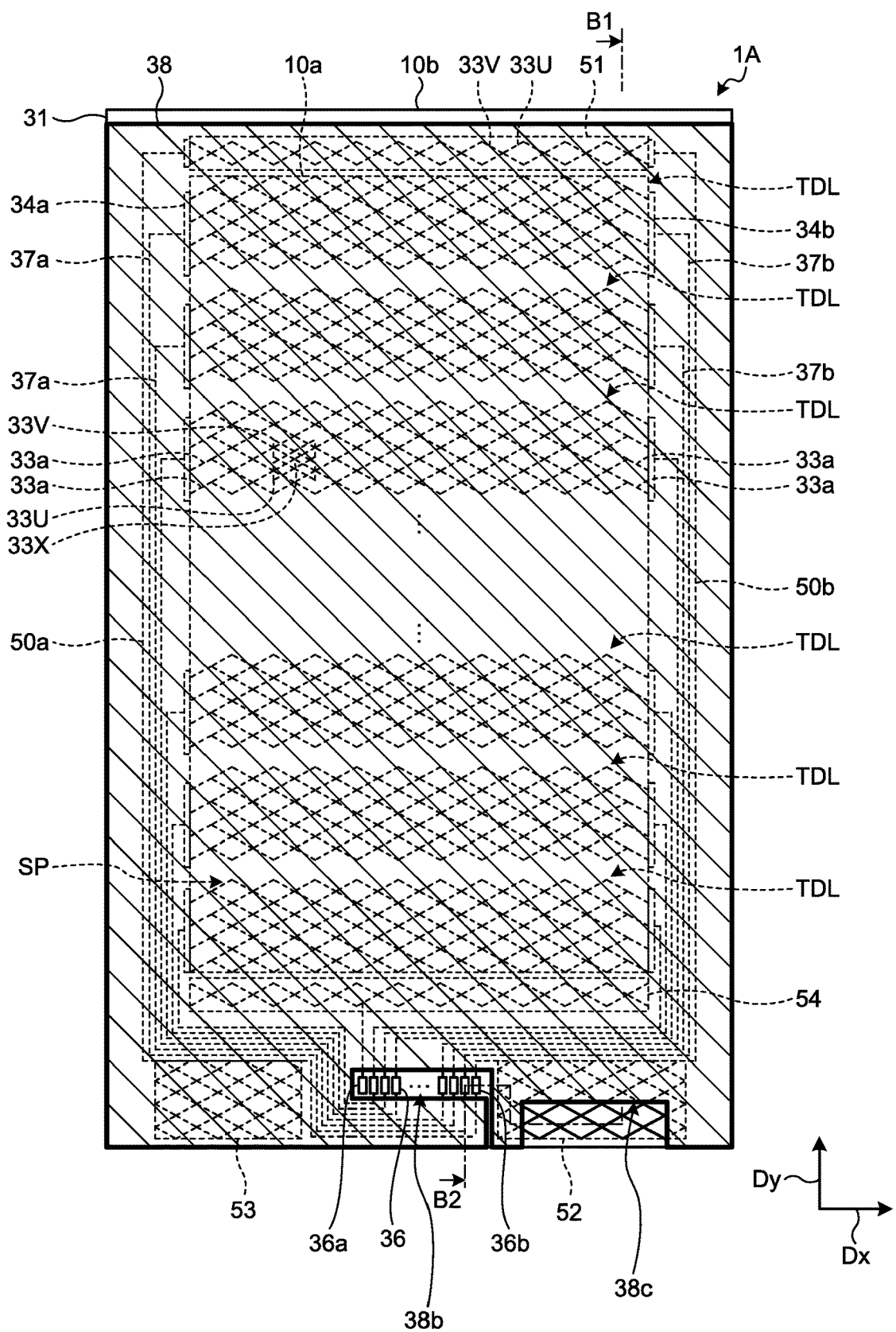
FIG. 14 is a plan view illustrating a protective layer according to the second embodiment.

FIG. 13 is a sectional view representing a schematic sectional structure of a display device according to a second embodiment. FIG. 14 is a plan view illustrating a protective layer according to the second embodiment. FIG. 13 is a schematic sectional view taken along the XIII-XIII line in FIG. 14. As illustrated in FIG. 13 and FIG. 14, the protective layer 38 in a display device 1A of this embodiment is provided overlapping the detection electrodes TDL, the first shielding layer 51, the third shielding layer 53, and the fourth shielding layer 54. The protective layer 38 is provided so as not to overlap at least a part of the second shielding layer 52. The conductive adhesive layer 39 is provided on the entire surface of the protective layer 38 and is in contact with a part of the second shielding layer 52, the part not overlapping the protective layer 38.

More specifically, as illustrated in FIG. 14, the protective layer 38 has an opening 38b and a recessed portion 38c. The opening 38b is formed in a position overlapping the terminal sections 36, 36a, and 36b. The terminal sections 36, 36a, and 36b are exposed from the protective layer 38 to be coupled to the flexible substrate 71 through the opening 38b.

The recessed portion 38c is formed in a region overlapping the second shielding layer 52. That is, the recessed portion 38c is formed in a part of the peripheral region 10b, the part extending along one edge thereof and having the flexible substrate 71 coupled thereto. In this embodiment, the second shielding layer 52 has some part overlapping the protective layer 38 and the other part not overlapping the protective layer 38. That is, at least a part of the second shielding layer 52 is exposed form the protective layer 38. The conductive adhesive layer 39 is in direct contact with the first conductive thin wires 33U and the second conductive thin wires 33V of the second shielding layer 52 through the recessed portion 38c of the protective layer 38. In other words, the conductive adhesive layer 39 is in contact with a part of the second shielding layer 52 in a part of the peripheral region 10b, the part extending along the edge thereof that has the terminal sections 36, 36a, and 36b and not overlapping the protective layer 38.

The second shielding layer 52 is likely to have a higher resistance in the part thereof not overlapping the protective layer 38 and be less functional as a shield than in the other part thereof. Even in such a case, the second shielding layer 52 can secure electrical continuity at least in the part thereof overlapping the protective layer 38. This example is not limiting, and the protective layer 38 may be provided in a position not overlapping the second shielding layer 52. That is, the entire region of the second shielding layer 52 may be exposed from the protective layer 38. In such a case, the contact area between the second shielding layer 52 and the conductive adhesive layer 39 is larger.

The display device 1A of this embodiment also has the conductive adhesive layer 39 provided in contact with the second shielding layer 52. Consequently, as in the example illustrated in FIG. 12, static electricity SE flows from the polarizing plate 35 to the second shielding layer 52 through the conductive adhesive layer 39. Consequently, the polarizing plate 35 can be prevented from being charged. Because the static electricity SE flows to the second shielding layer 52, the detection electrodes TDL as well can be prevented from being charged. As described above, the display device 1A of this embodiment can prevent the static electricity SE from degrading the display quality and reducing the touch detection accuracy.

This embodiment is not limited to the configuration illustrated in FIG. 13 and FIG. 14, the conductive adhesive layer 39 may be in contact with the third shielding layer 53 instead, or may be in contact with both the second shielding layer 52 and the third shielding layer 53. In such cases, a recessed portion is formed in a part of the protective layer 38, the part overlapping the third shielding layer 53, so that at least a part of the third shielding layer 53 is thus exposed from the protective layer 38.

Third Embodiment

Figure 15:
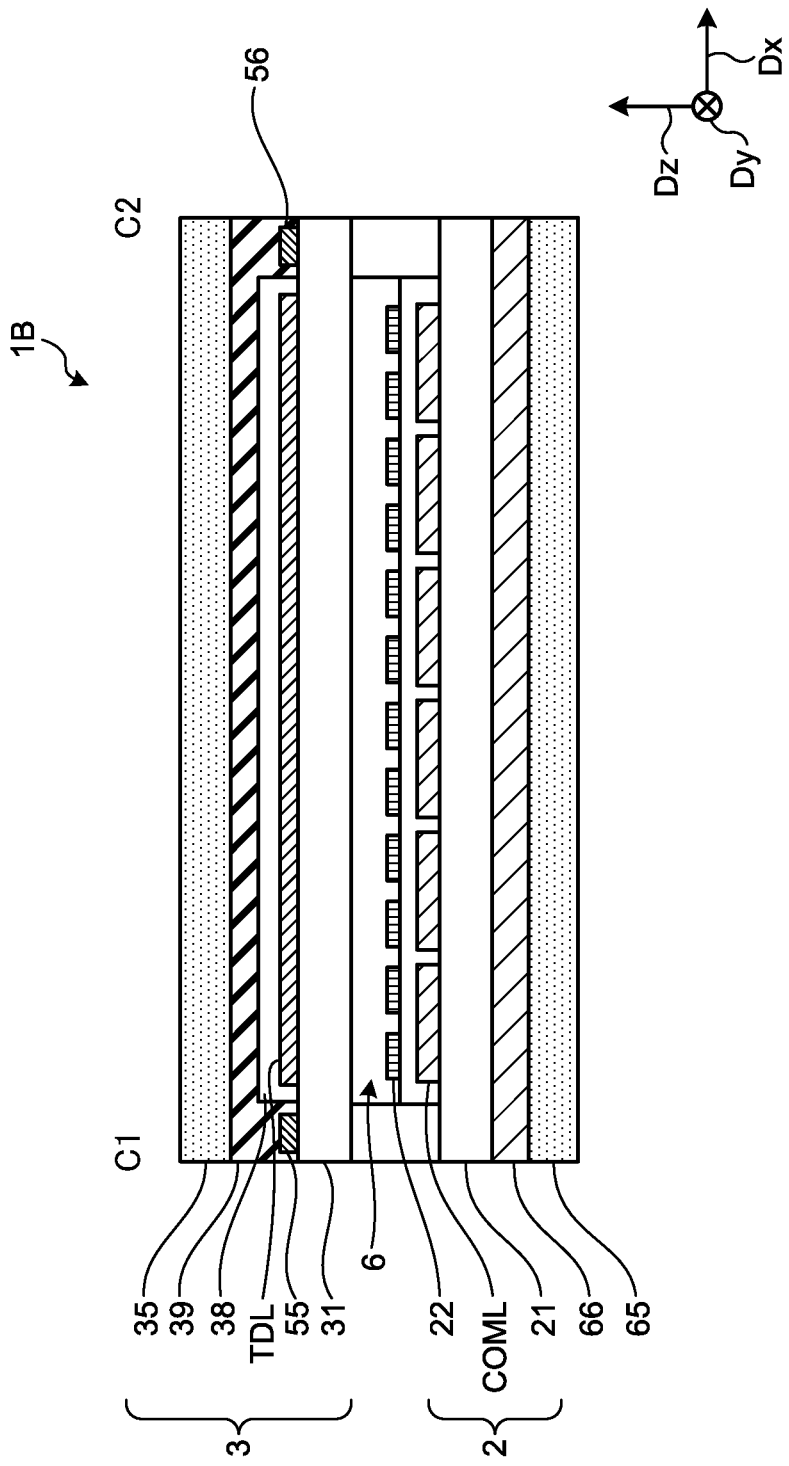
FIG. 15 is a sectional view representing a schematic sectional structure of a display device according to a third embodiment.
Figure 16:
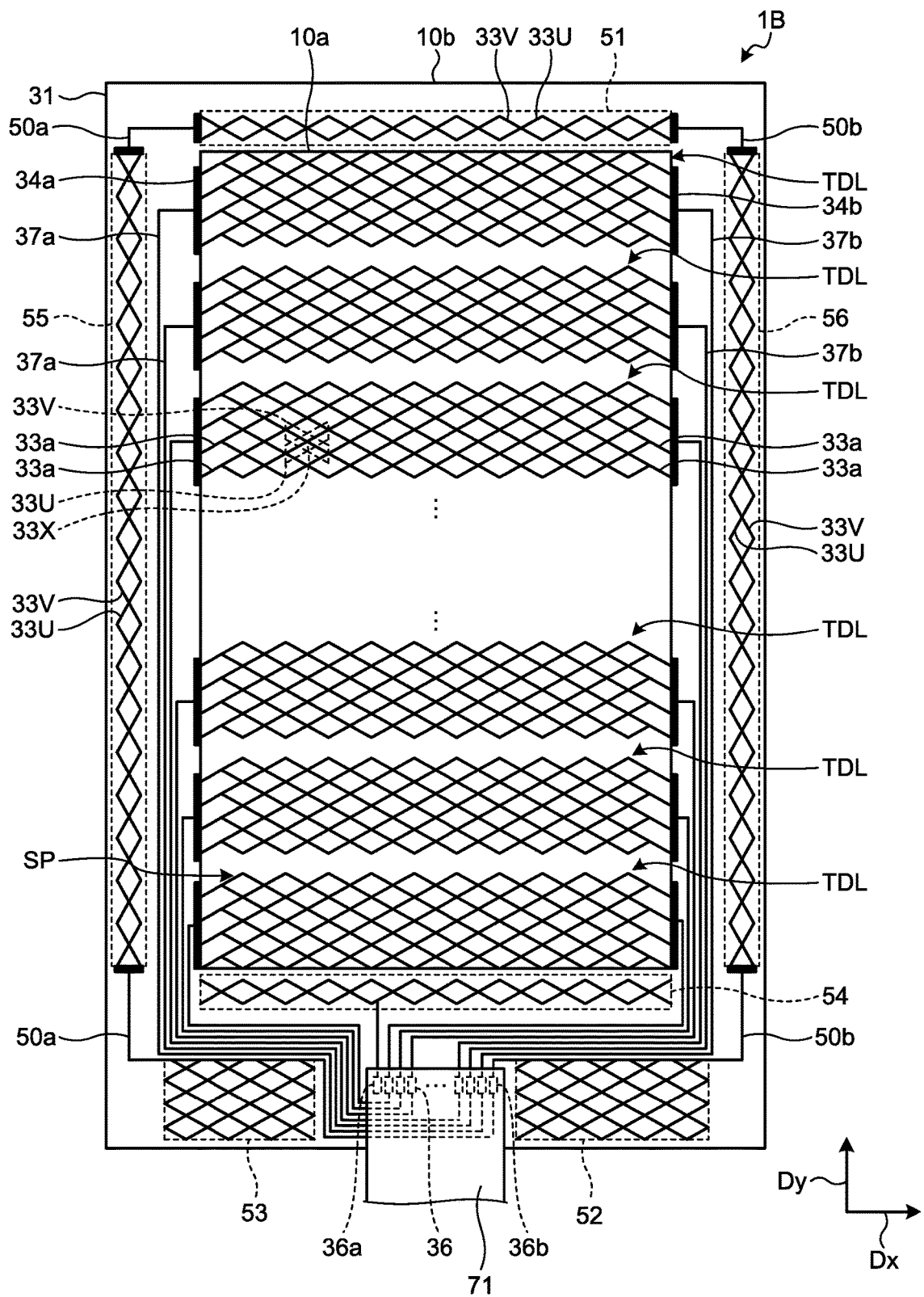
FIG. 16 is a plan view of a second substrate according to the third embodiment.
Figure 17:
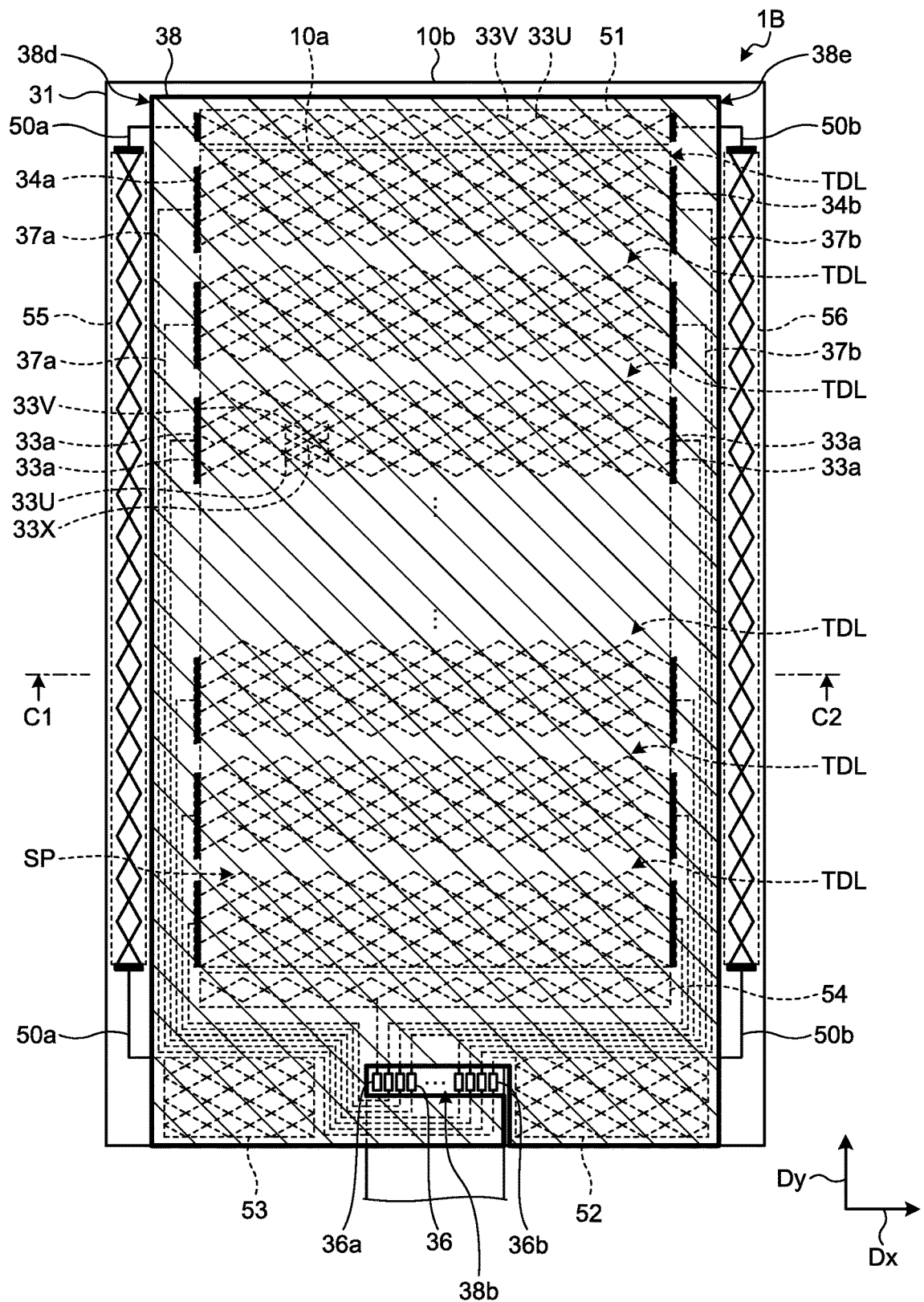
FIG. 17 is a plan view illustrating a protective layer according to the third embodiment.

FIG. 15 is a sectional view representing a schematic sectional structure of a display device according to a third embodiment. FIG. 16 is a plan view of a second substrate according to the third embodiment. FIG. 17 is a plan view illustrating a protective layer according to the third embodiment. The sectional view illustrated in FIG. 15 is a view taken along a direction different from a direction along which the sectional views illustrated in FIG. 5 and FIG. 13 are taken. Specifically, FIG. 15 is a sectional view taken along the XV-XV line in FIG. 17.

As illustrated in FIG. 16, in this embodiment, a fifth shielding layer 55 and a sixth shielding layer 56 are provided on the second substrate 31 in the peripheral region 10b. The fifth shielding layer 55 and the sixth shielding layer 56 are each provided in parts of the peripheral region 10b that extend along two edges thereof that face each other in the first direction Dx. In other words, the fifth shielding layer 55 and the sixth shielding layer 56 are provided in parts of the peripheral region 10b that extend in a direction intersecting one edge thereof along which a part having the terminal sections 36, 36a, and 36b extends.

The fifth shielding layer 55 and the sixth shielding layer 56 each extend in the second direction Dy and are disposed facing opposite ends of each of the detection electrodes TDL. The fifth shielding layer 55 and the sixth shielding layer 56 are disposed outside the detection electrodes TDL, the first wires 37a, and the second wires 37b.

The fifth shielding layer 55 and the sixth shielding layer 56 each include first conductive thin wires 33U and second conductive thin wires 33V. The fifth shielding layer 55 and the sixth shielding layer 56 are formed in respective mesh-like structures similar to those of the first shielding layer 51, the second shielding layer 52, the third shielding layer 53, and the fourth shielding layer 54.

One end of the fifth shielding layer 55 is coupled to the first shielding layer 51 via a wire 50a. The other end of the fifth shielding layer 55 is coupled to the third shielding layer 53 and the terminal section 36b via another wire 50a. One end of the sixth shielding layer 56 is coupled to the first shielding layer 51 via a wire 50b. The other end of the sixth shielding layer 56 is coupled to the second shielding layer 52 and the terminal section 36b via another wire 50b. The fifth shielding layer 55 and the sixth shielding layer 56 are coupled to the flexible substrate 71 via the terminal section 36b.

As illustrated in FIG. 17, the protective layer 38 is provided overlapping the detection electrodes TDL, the first wires 37a, the second wires 37b, the first shielding layer 51, the second shielding layer 52, the third shielding layer 53, and the fourth shielding layer 54. The length of the protective layer 38 in the first direction Dx is shorter than the length of the second substrate 31 in the first direction Dx. Ends 38d and 38e of the protective layer 38 that face each other in the first direction Dx are each positioned closer to the display region 10a than the fifth shielding layer 55 and the sixth shielding layer 56 are. Consequently, at least a part of the fifth shielding layer 55 and at least a part of the sixth shielding layer 56 are disposed in positions not overlapping the protective layer 38.

As illustrated in FIG. 15, the conductive adhesive layer 39 is provided on the entire surface of the protective layer 38. The conductive adhesive layer 39 is in contact with the first conductive thin wires 33U and the second conductive thin wires 33V of the fifth shielding layer 55 and the sixth shielding layer 56 in a region outside of the ends 38d and 38e of the protective layer 38. In other words, the conductive adhesive layer 39 is in contact with the fifth shielding layer 55 and the sixth shielding layer 56 in parts of the peripheral region 10b that extend along opposite edges thereof intersecting the edge thereof along which the part having the terminal sections 36, 36a, and 36b extends.

Also in a display device 1B in this embodiment, the conductive adhesive layer 39 is provided in contact with the fifth shielding layer 55 and the sixth shielding layer 56. Consequently, as in the case illustrated in FIG. 12, static electricity SE flows from the polarizing plate 35 to the fifth shielding layer 55 and the sixth shielding layer 56 through the conductive adhesive layer 39. Consequently, the polarizing plate 35 can be prevented from being charged. Because the static electricity SE flows to the fifth shielding layer 55 and the sixth shielding layer 56, the detection electrodes TDL as well can be prevented from being charged. As described above, the display device 1B of this embodiment can prevent the static electricity SE from degrading the display quality and reducing the touch detection accuracy.

The first to the third embodiments described above may be used in combination as appropriate. The conductive adhesive layer 39 may be in contact with all of the first shielding layer 51 to the sixth shielding layer 56. At least one of the first shielding layer 51 to the sixth shielding layer 56 needs to be provided. At least one of the first shielding layer 51 to the sixth shielding layer 56 may be a conductive layer that does not have the function of a shield and that has conductivity.

Fourth Embodiment

Figure 18:
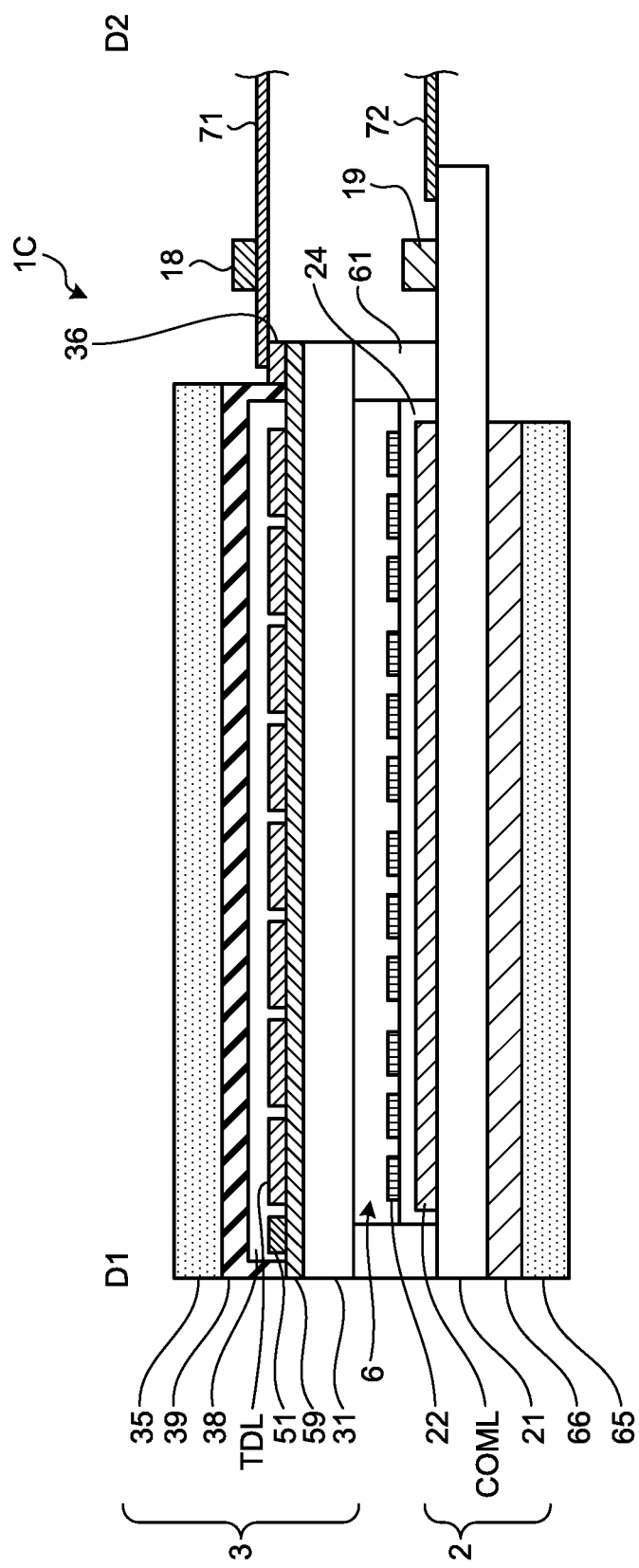
FIG. 18 is a sectional view representing a schematic sectional structure of a display device according to a fourth embodiment.
Figure 19:
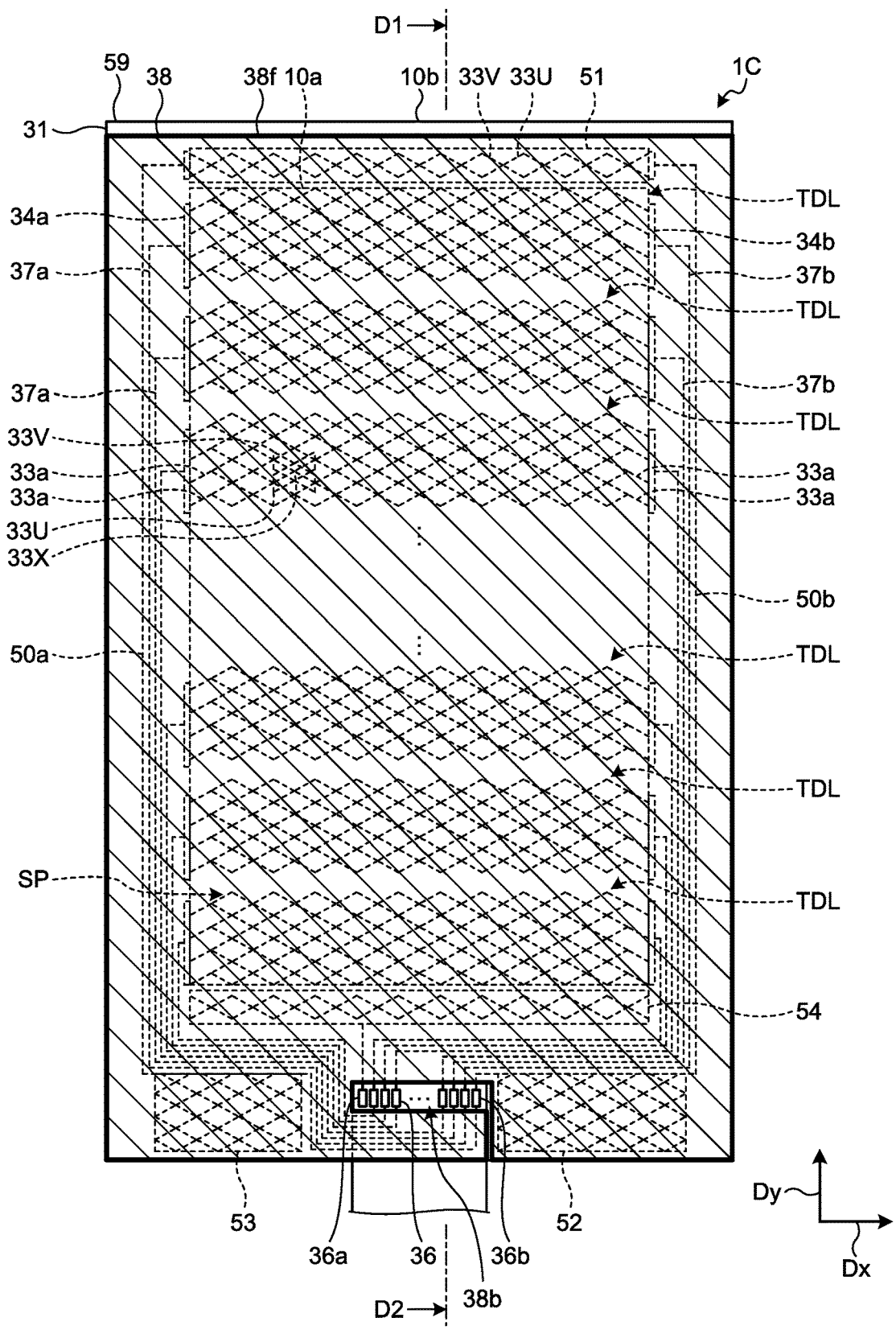
FIG. 19 is a plan view illustrating a protective layer according to the fourth embodiment.

FIG. 18 is a sectional view representing a schematic sectional structure of a display device according to a fourth embodiment. FIG. 19 is a plan view illustrating a protective layer according to the fourth embodiment. FIG. 18 is a sectional view taken along the XVIII-XVIII line in FIG. 19. In a display device 1C of this embodiment, the conductive layer 59 is provided above the second substrate 31. The conductive layer 59 is provided between the second substrate 31 and the detection electrodes TDL in a direction perpendicular to a surface of the second substrate 31.

The detection electrodes TDL, the first shielding layer 51, the second shielding layer 52, the third shielding layer 53, and the fourth shielding layer 54 (among which only the detection electrodes TDL and the first shielding layer 51 are illustrated in FIG. 18) are provided in contact with the conductive layer 59. The protective layer 38 is provided overlapping the detection electrodes TDL, the first shielding layer 51, the second shielding layer 52, the third shielding layer 53, and the fourth shielding layer 54.

As illustrated in FIG. 19, the length of the protective layer 38 in the second direction Dy is shorter than the length of the second substrate 31 in the second direction Dy. An end 38f of the protective layer 38 in the second direction Dy is positioned closer to the display region 10a than the outer perimeter of the conductive layer 59 is. This configuration leaves a part of the conductive layer 59 exposed from the protective layer 38.

The conductive layer 59 is formed on almost the entire surface of the second substrate 31, and is seamlessly provided on a plane corresponding to the entire display region 10a and the peripheral region 10b. That is, the conductive layer 59 has some parts overlapping the first conductive thin wires 33U and the second conductive thin wires 33V of the detection electrodes TDL and the other parts not overlapping the first conductive thin wires 33U and the second conductive thin wires 33V. Adjacent ones of the first conductive thin wires 33U are coupled to each other, and adjacent ones of the second conductive thin wires 33V are coupled to each other, by the parts of the conductive layer 59 that are not overlapping the first conductive thin wires 33U and the second conductive thin wires 33V.

As illustrated in FIG. 18, the conductive adhesive layer 39 is provided on the entire surface of the protective layer 38. The conductive adhesive layer 39 is in contact with a part of the conductive layer 59 in the peripheral region 10b, the part not overlapping the protective layer 38.

The conductive layer 59 is preferably provided in a position such that it overlaps the coupling wires 34a and 34b, the first wires 37a, and the second wires 37b, as illustrated in FIG. 19. The area of the conductive layer 59 in planar view is larger than the total of the areas of the first conductive thin wires 33U and the second conductive thin wires 33V.

The conductive layer 59 is provided as a preventative measure against ESD. The conductive layer 59 is a light-transmissive conductive layer, and contains at least one of ITO, indium zinc oxide (IZO), tin oxide (SnO), and a conductive organic film, for example. The conductive layer 59 may include an insulating oxide in addition to at least one of the materials listed above. The conductive layer 59 may be made of a light-transmissive conductive layer such as any one of the following layers disclosed, for example, in Japanese Patent Application Laid-open Publication No. 2007-148201 A and Japanese Patent Application Laid-open Publication No. 2013-142194 A: an oxide layer consisting primarily of tin dioxide ($SnO_2$) and silicon dioxide ($SiO_2$); another oxide layer consisting primarily of gallium(III) oxide ($Ga_2O_3$), indium(II) oxide ($In_2O_3$), and tin dioxide ($SnO_2$); and a light-transmissive conductive layer consisting primarily of ITO and also containing silicon (Si).

Figure 20:
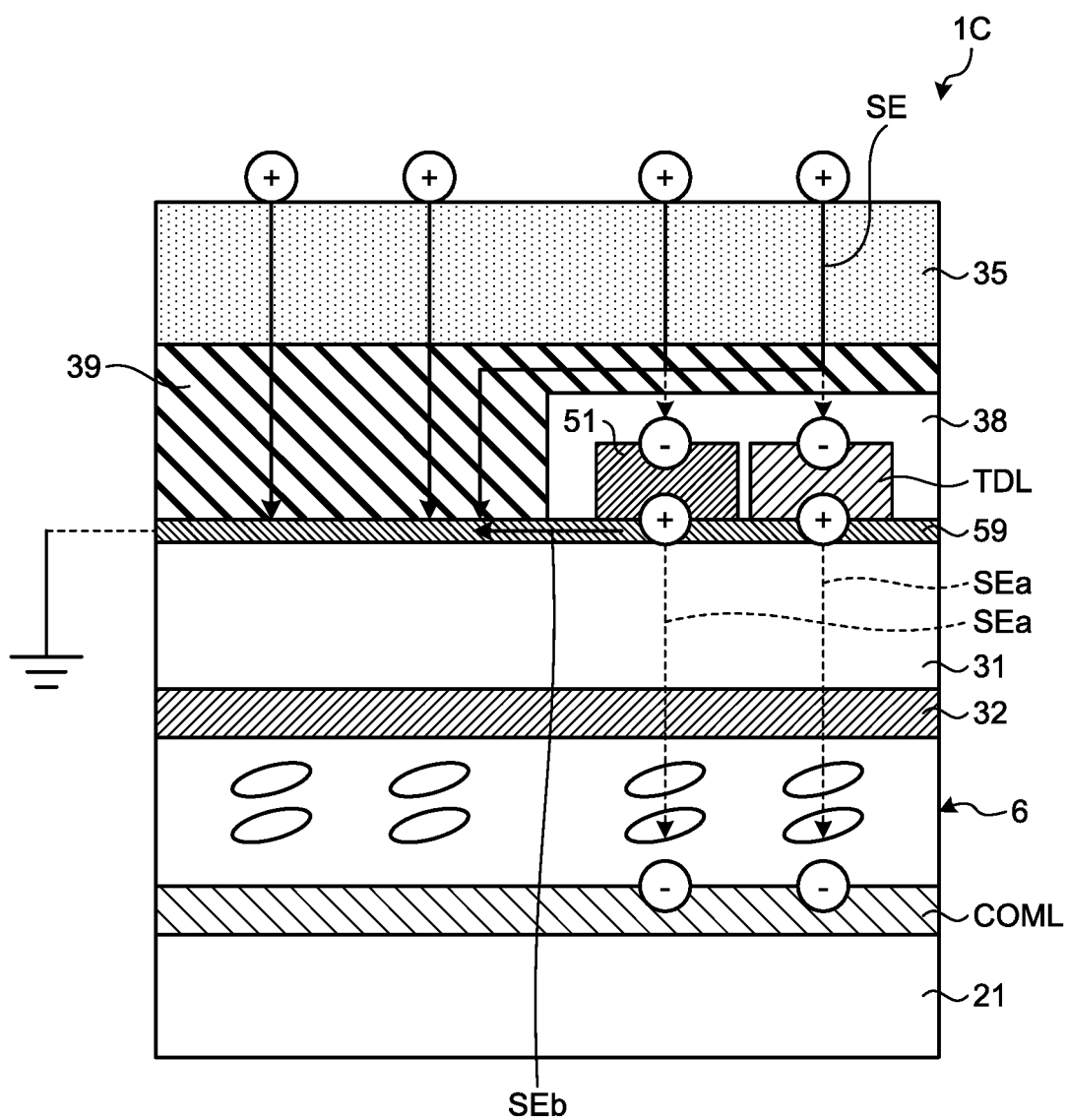
FIG. 20 is an explanatory diagram for schematically explaining flows of static electricity according to the fourth embodiment.

FIG. 20 is an explanatory diagram for schematically explaining flows of static electricity according to the fourth embodiment. As illustrated in FIG. 20, when static electricity SE is applied to the surface of polarizing plate 35 from the outside, the static electricity SE flows to the conductive adhesive layer 39 through the polarizing plate 35. The static electricity SE that has flowed to the conductive adhesive layer 39 then flows to the conductive layer 59. The conductive adhesive layer 39 is thus provided in direct contact with the polarizing plate 35 and the conductive layer 59. Consequently, the polarizing plate 35 can be prevented from being charged.

As illustrated in FIG. 20, the conductive layer 59 overlaps the first conductive thin wires 33U and the second conductive thin wires 33V of the first shielding layer 51 and the detection electrodes TDL in direct contact therewith. This configuration causes static electricity SEb to flow to the conductive layer 59 after the static electricity SE from the outside flows to the first shielding layer 51 and the detection electrodes TDL.

As described above, each of the detection electrodes TDL includes the sensor sections TDLs and the dummy sections TDLd (see FIG. 9). Without the conductive layer 59, the dummy sections TDLd are left uncoupled to the sensor sections TDLs and various wires. This state makes it likely that electric charges to be carried by the dummy sections TDLd when the static electricity SE is applied thereto from the outside cannot be discharged readily as a result.

In this embodiment, the conductive layer 59 is in contact with the sensor sections TDLs and the dummy sections TDLd. After the static electricity SE flows from the outside reaches the dummy section TDLd, this configuration causes the static electricity SE to flow from the dummy section TDLd to the conductive layer 59. In this embodiment, the conductive layer 59 is provided in contact with the dummy sections TDLd of the detection electrodes TDL, so that electric charges carried by the dummy sections TDLd can be discharged quickly.

The static electricity SE that has flowed to the conductive layer 59 then flows to a power supply and the ground potential (GND) through a resistive element included in the touch detector 40 and through an ESD-protection circuit (not illustrated), that is, the static electricity SE is discharged. The conductive layer 59 may be grounded to, for example, a housing of the display device 1C.

The conductive layer 59 is preferably disposed on the second substrate 31 from end to end thereof. The conductive layer 59 may further be electrically coupled to the power supply or GND through a conductive tape or the like from the peripheral region 10b.

In this embodiment, this configuration is provided with the conductive adhesive layer 39 and the conductive layer 59 and thereby can prevent the polarizing plate 35 from being charged. Furthermore, in this embodiment, static electricity SEa that otherwise flows from the detection electrodes TDL to the drive electrodes COML through the liquid crystal layer 6 can be prevented from thus flowing. Thus, the display device 1C of this embodiment can prevent the static electricity SE from degrading the display quality and reducing the touch detection accuracy.

The conductive layer 59 has a sheet resistance, for example, within the range of $10^8$ to $10^{14}$ ohms per square. More preferably, the conductive layer 59 has a sheet resistance, for example, within the range of $10^9$ to $10^{13}$ ohms per square. The sheet resistance of the conductive layer 59 is lower than the resistance of the polarizing plate 35. The sheet resistance of the conductive layer 59 is higher than the sheet resistances of the first conductive thin wires 33U and of the second conductive thin wires 33V. The conductive layer 59 has a higher sheet resistance than the first shielding layer 51 and the detection electrodes TDL.

If the conductive layer 59 has a sheet resistance lower than $10^8$ ohms per square, the conductive layer 59 is likely to function as a shield and deteriorate the touch detection performance. If the conductive layer 59 has a sheet resistance higher than $10^{14}$ ohms per square, the static electricity SE is likely to be impeded from favorably flowing to the conductive layer 59. The conductive adhesive layer 39 preferably has a sheet resistance less than or equal to the sheet resistance of the conductive layer 59. This condition prevents the polarizing plate 35 from being charged with the static electricity SE, thereby enabling the static electricity SE to quickly flow from the polarizing plate 35 to the conductive layer 59.

The sheet resistances of the conductive adhesive layer 39 and the conductive layer 59 are lower than the resistance of the polarizing plate 35, so that the static electricity SE favorably flows through the conductive adhesive layer 39 and the conductive layer 59. The sheet resistances of the conductive adhesive layer 39 and the conductive layer 59 are each higher than the sheet resistances of the first conductive thin wires 33U and the second conductive thin wires 33V, so that the conductive adhesive layer 39 and the conductive layer 59 do not function as a shield and do not deteriorate the touch detection performance With the sheet resistances within the above ranges, the static electricity SE flows to the conductive adhesive layer 39 and the conductive layer 59 from the polarizing plate 35, and the static electricity can be quickly discharged. Furthermore, the detection electrodes TDL can be prevented from being charged.

Fifth Embodiment

Figure 21:
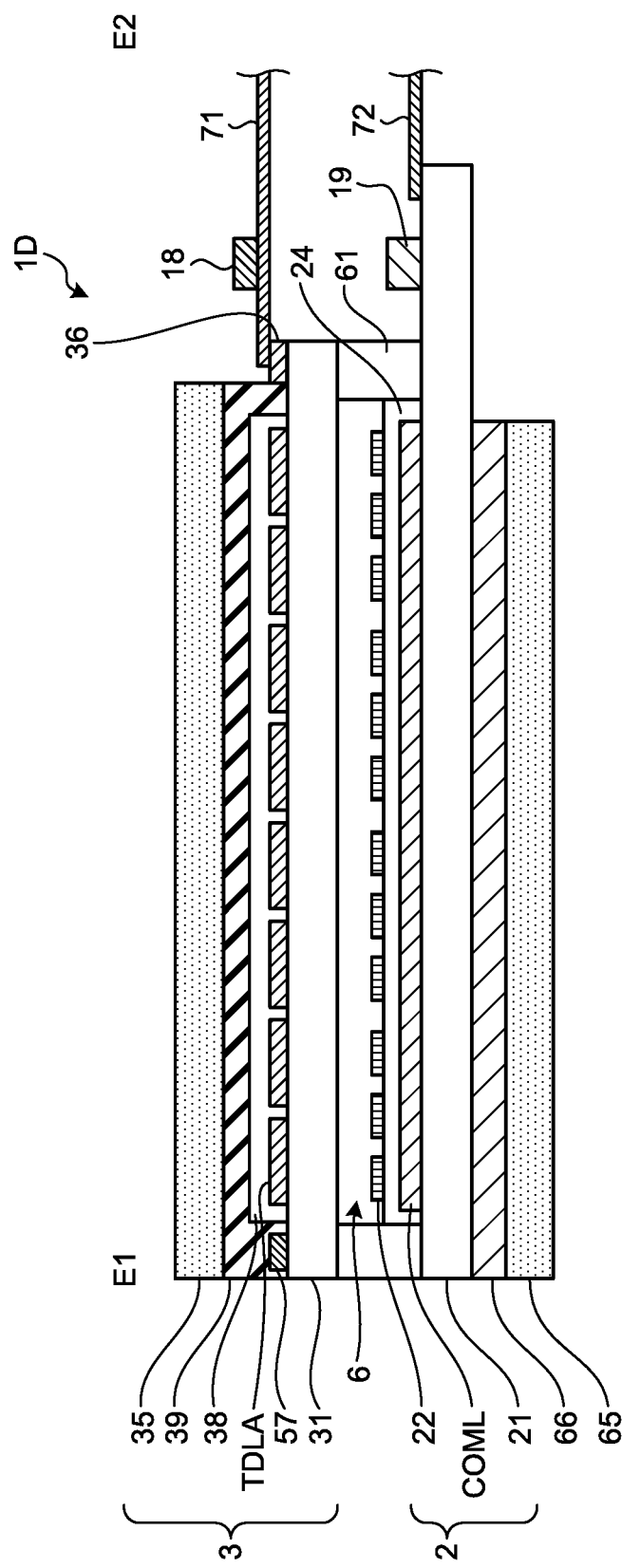
FIG. 21 is a sectional view representing a schematic sectional structure of a display device according to a fifth embodiment.
Figure 22:
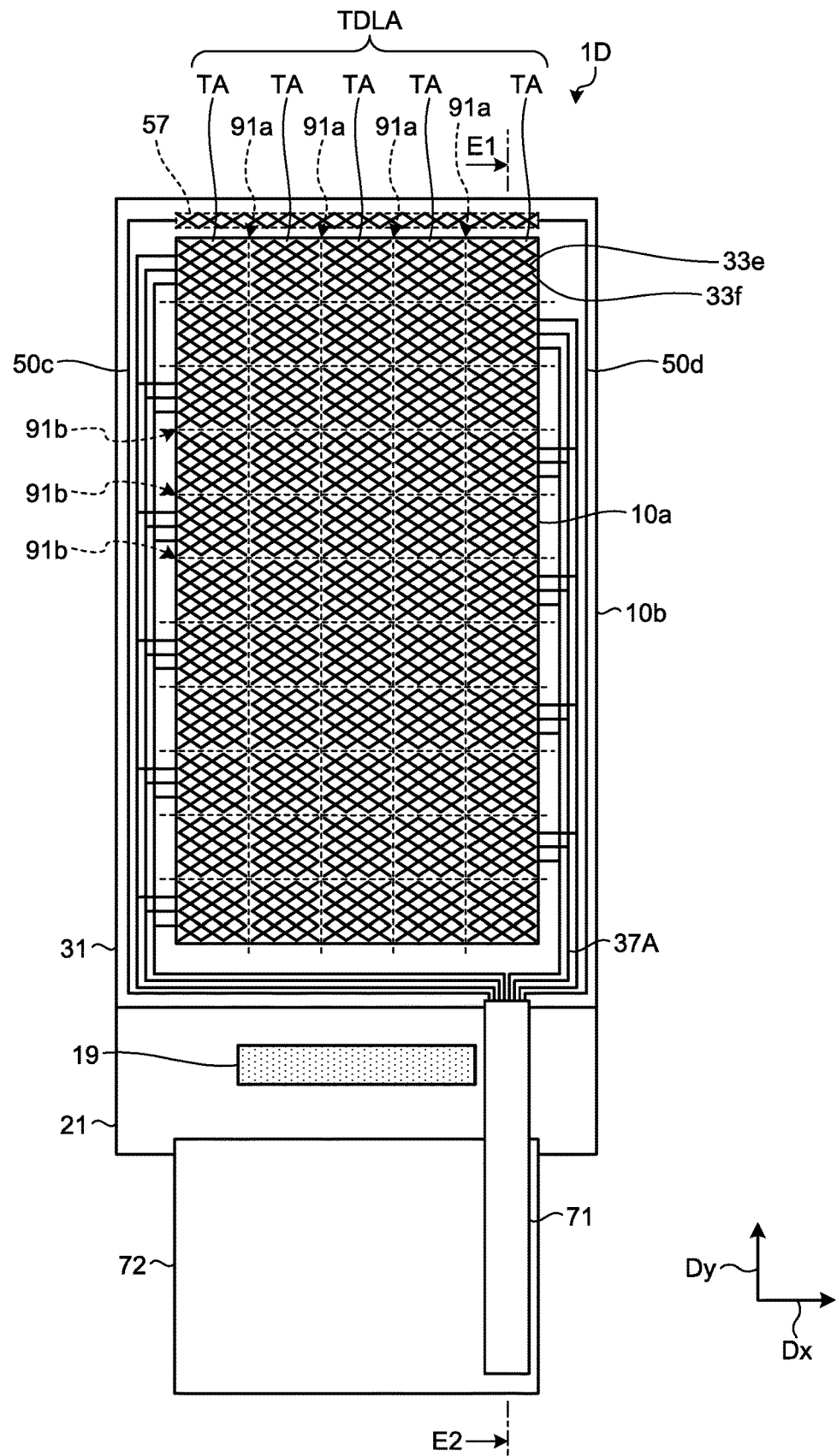
FIG. 22 is a plan view of a second substrate according to the fifth embodiment.
Figure 23:
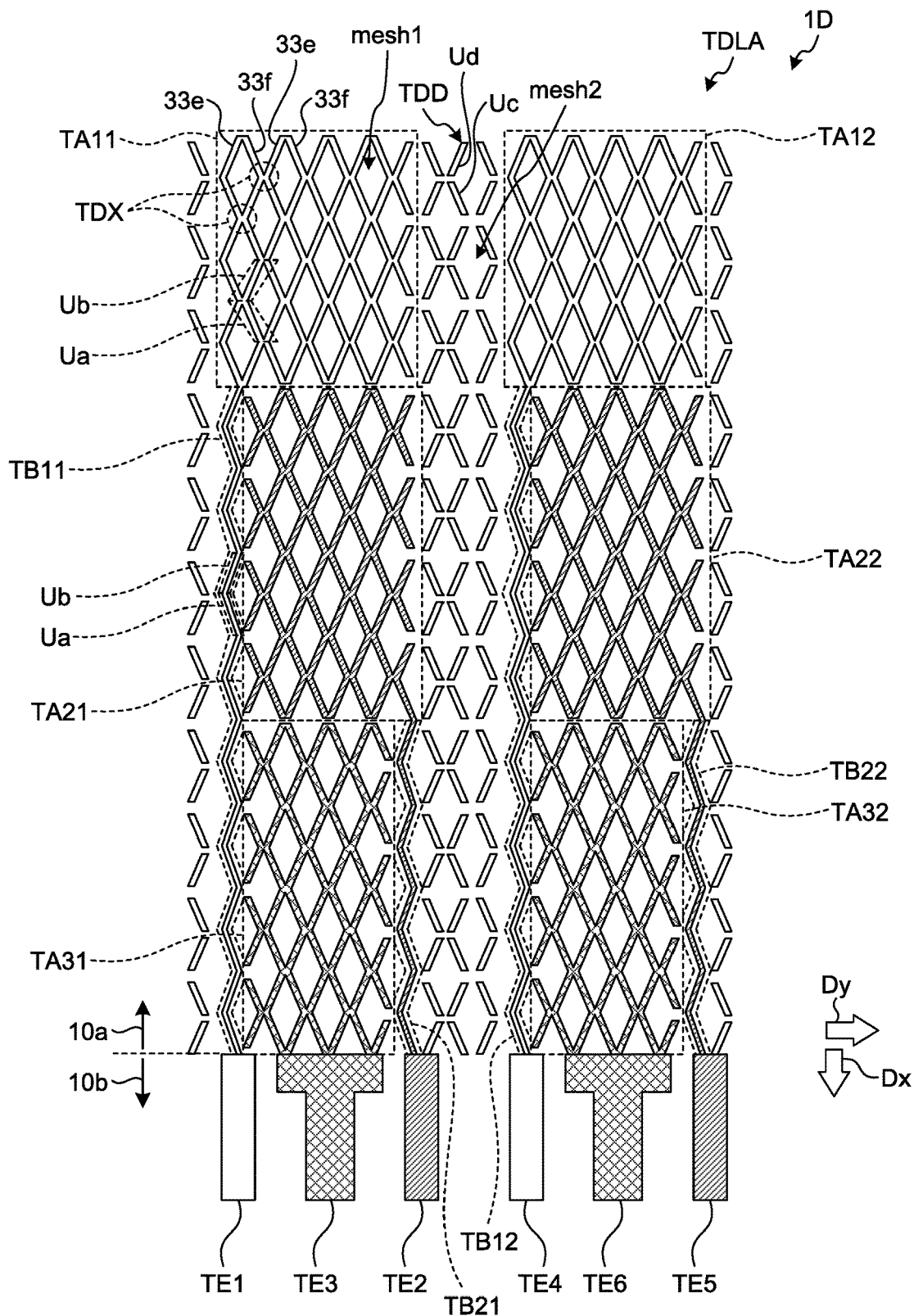
FIG. 23 is a plan view partially illustrating, in an enlarged manner, a detection electrode according to the fifth embodiment.

FIG. 21 is a sectional view representing a schematic sectional structure of a display device according to a fifth embodiment. FIG. 22 is a plan view of a second substrate according to the fifth embodiment. FIG. 23 is a plan view partially illustrating, in an enlarged manner, a detection electrode according to the fifth embodiment. FIG. 21 is a sectional view taken along the XXI-XXI line in FIG. 22. While the display devices 1 and 1A to 1C to perform mutual capacitance touch detection have been described above in the first to the fourth embodiments, these examples are not limiting. A display device 1D of this embodiment performs self-capacitance touch detection using a detection electrode TDLA.

As illustrated in FIG. 21, the detection electrode TDLA and a seventh shielding layer 57 are provided on the second substrate 31. The protective layer 38 is provided on the detection electrode TDLA. The conductive adhesive layer 39 is provided between the protective layer 38 and the polarizing plate 35. The conductive adhesive layer 39 is provided on the entire surface of the protective layer 38. Furthermore, the conductive adhesive layer 39 is provided in contact with a part of the seventh shielding layer 57, the part not overlapping the protective layer 38.

As illustrated in FIG. 22, the detection electrode TDLA includes a plurality of small electrode sections TA disposed in a matrix (row-column configuration). Each of these small electrode sections TA includes a plurality of metal wires 33e and a plurality of metal wires 33f. The metal wires 33e and the metal wires 33f have the same structure as the first conductive thin wires 33U and the second conductive thin wires 33V (see FIG. 8 and FIG. 9). That is, when the metal wires 33e intersect the metal wires 33f, each opening of a mesh formed by the detection electrode TDLA forms a parallelogram. The metal wires 33e are arranged side by side, and the metal wires 33f are arranged side by side, in the display region 10a in the second direction Dy, so that the metal wires forming a mesh-like pattern are formed in almost the entire display region 10a.

As illustrated in FIG. 22, the small electrode sections TA are disposed in a matrix with spaces between adjacent ones thereof. The small electrode sections TA that are arranged side by side in the first direction Dx are electrically isolated from one another by slits provided in positions indicated by dotted lines 91a. The small electrode sections TA that are arranged side by side in the second direction Dy are electrically isolated from one another by slits provided in positions indicated by dotted lines 91b. These small electrode sections TA are coupled to the flexible substrate 71 via wires 37A provided in the peripheral region 10b.

In this embodiment, these small electrode sections TA each function as a detection electrode. The display device 1D of this embodiment is capable of detecting, based on the self-capacitances of the small electrode sections TA, a detected object, such as a finger. The drive-electrode driver 14 (see FIG. 1) supplies drive signals to these small electrode sections TA in the display region 10a simultaneously or in a time-division manner. The small electrode sections TA output signals to the voltage detector DET (see FIG. 3), the signals being based on changes in capacitance of the respective small electrode sections TA. The detector 40 thus performs self-capacitance touch detection. In this case, the drive electrodes COML illustrated in FIG. 21 do not function as drive electrodes during touch detection, but function as common electrodes during display operation.

As illustrated in FIG. 22, the seventh shielding layer 57 is provided on the second substrate 31 in the peripheral region 10b. The seventh shielding layer 57 has metal wires forming the same mesh-like pattern as the detection electrode TDLA. The seventh shielding layer 57 is provided in a part of the peripheral region 10b, the part extending along one edge thereof opposite across the display region 10a to another edge thereof along which a part having the flexible substrates 71 and 72 coupled thereto extends. The seventh shielding layer 57 is coupled to the flexible substrate 71 via wires 50c and 50d.

The detailed configuration of the detection electrode TDLA of this embodiment is described next. As illustrated in FIG. 23, the detection electrode TDLA according to this embodiment includes small electrode sections TA11, TA21, TA31, TA12, TA22, and TA32. The small electrode section TA11 includes a plurality of metal wires 33e and a plurality of the metal wires 33f, the plurality of metal wires 33e and the plurality of metal wires 33f extending in the second direction Dy on a plane parallel to the second substrate 31 (see FIG. 21). These metal wires 33e and these metal wires 33f are alternately arranged in the second direction Dy while being coupled to one another. The metal wires 33e and the metal wires 33f are formed of the same material, for which at least one of the above-listed metal materials is used.

These metal wires 33e and these metal wires 33f are electrically continuous to one another through intersections TDX. These metal wires 33e and these metal wires 33f form enclosed regions mesh 1 each enclosed by thin wire fragments Ua and thin wire fragments Ub. These metal wires 33e and these metal wires 33f may be coupled to one another through portions other than the intersections TDX. For example, these metal wires 33e and these metal wires 33f may be coupled and electrically continuous to one another through intermediate portions of the thin wire fragments Ua of the metal wires 33e and intermediate portions of the thin wire fragments Ub of the metal wires 33f. Each of the small electrode sections TA21, TA31, TA12, TA22, and TA32 has the same structure as the small electrode section TA11.

The small electrode section TA11 is coupled via a wire section TB11 to a terminal section TE1 formed in the peripheral region 10b. The wire section TB11 has a structure having a plurality of thin wire fragments Ua and a plurality of thin wire fragments Ub alternately arranged in the second direction Dy and coupled to one another, and extends from the small electrode section TA11 to the peripheral region 10b in the first direction Dx.

Likewise, the small electrode section TA21 is coupled via a wire section TB21 to a terminal section TE2 formed in the peripheral region 10b. The small electrode section TA12 is coupled via a wire section TB12 to a terminal section TE4 formed in the peripheral region 10b. The small electrode section TA22 is coupled via a wire section TB22 to a terminal section TE5 formed in the peripheral region 10b.

In the same manner as the wire section TB11, each of the wire sections TB21, TB12, and TB22 has a structure having a plurality of thin wire fragments Ua and a plurality of thin wire fragments Ub alternately arranged in the second direction Dy and coupled to one another. The small electrode section TA31 is positioned in an end of the display region 10a. For this reason, the small electrode section TA31 is coupled directly to a terminal section TE3 formed in the peripheral region 10b. Likewise, the small electrode section TA32 is coupled directly to a terminal section TE6 formed in the peripheral region 10b. The terminal sections TE1, TE2, . . . , and TE6 are coupled to the wires 37A illustrated in FIG. 22.

A dummy electrode TDD includes thin wire fragments Uc and thin wire fragments Ud. The thin wire fragments Uc each have a shape substantially identical to the shape of each of the thin wire fragments Ua. The thin wire fragments Ud each have a shape substantially identical to the shape of each of the thin wire fragments Ub. The thin wire fragments Uc are disposed in parallel to the thin wire fragments Ua, and the thin wire fragments Ud are disposed in parallel to the thin wire fragments Ub. The thin wire fragments Uc and the thin wire fragments Ud are disposed so that an enclosed region mesh 2 enclosed by two of the thin wire fragments Uc and two of the thin wire fragments Ud can have the same area as the enclosed region mesh 1. This configuration reduces the difference in light blocking level between a region having the detection electrode TDLA disposed therein and the other region, thereby lowering the likelihood that the detection electrode TDLA becomes readily visible.

The above configuration enables the display device 1D to have a higher touch detection probability because, even if the metal wires 33e or the metal wires 33f have a part that has become thinner to the extent that the electrical continuity through this part is unreliable, the metal wires having this part are coupled through the intersections TDX to the metal wires 33e or 33f that do not include this part.

Also in this embodiment, as illustrated in FIG. 21, the conductive adhesive layer 39 is in contact with the seventh shielding layer 57 in a part of the peripheral region 10b, the part extending along an edge thereof opposite across the display region 10a to another edge thereof along which the part having the flexible substrate 71 extends. Consequently, as in the example illustrated in FIG. 12, static electricity SE flows from the polarizing plate 35 to the seventh shielding layer 57 through the conductive adhesive layer 39. Consequently, the polarizing plate 35 can be prevented from being charged. Because the static electricity SE flows to the seventh shielding layer 57, the detection electrodes TDLA as well can be prevented from being charged. As described above, the display device 1D of this embodiment can prevent the static electricity SE from degrading the display quality and reducing the touch detection accuracy.

Sixth Embodiment

Figure 24:
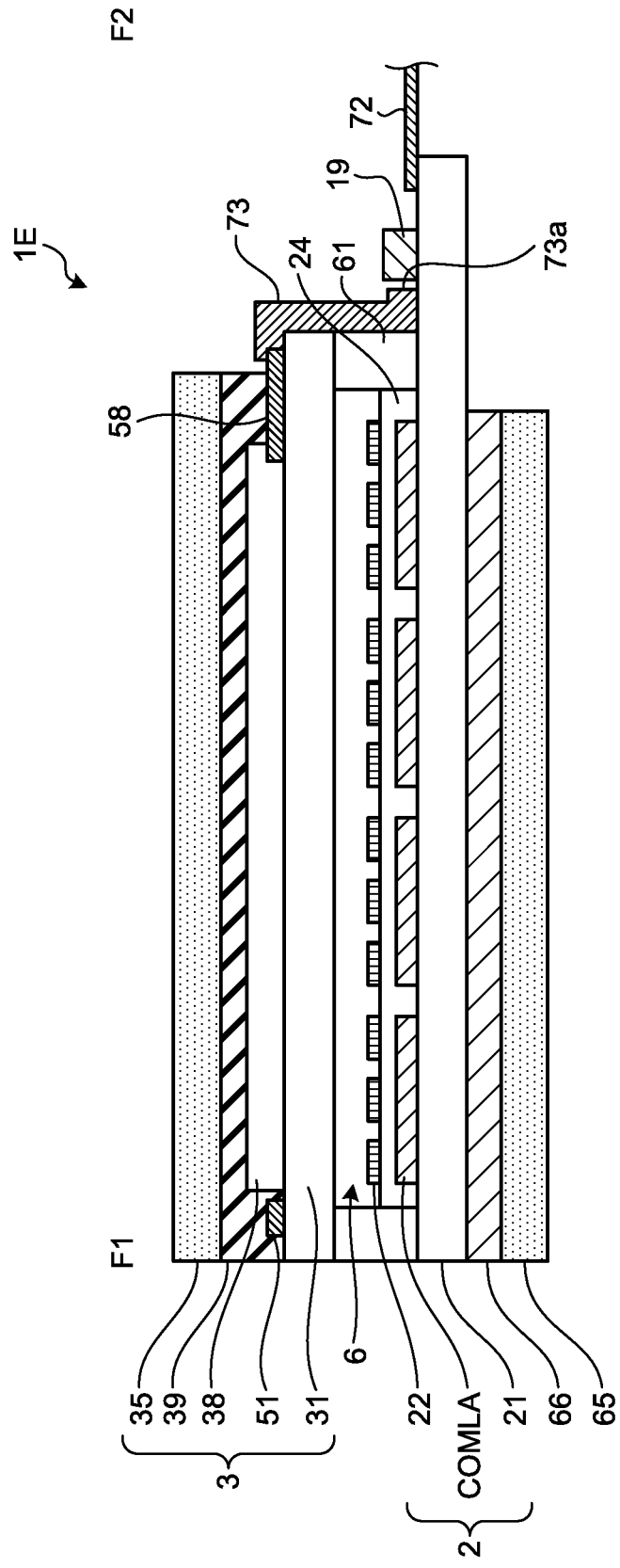
FIG. 24 is a sectional view representing a schematic sectional structure of a display device according to a sixth embodiment.
Figure 25:
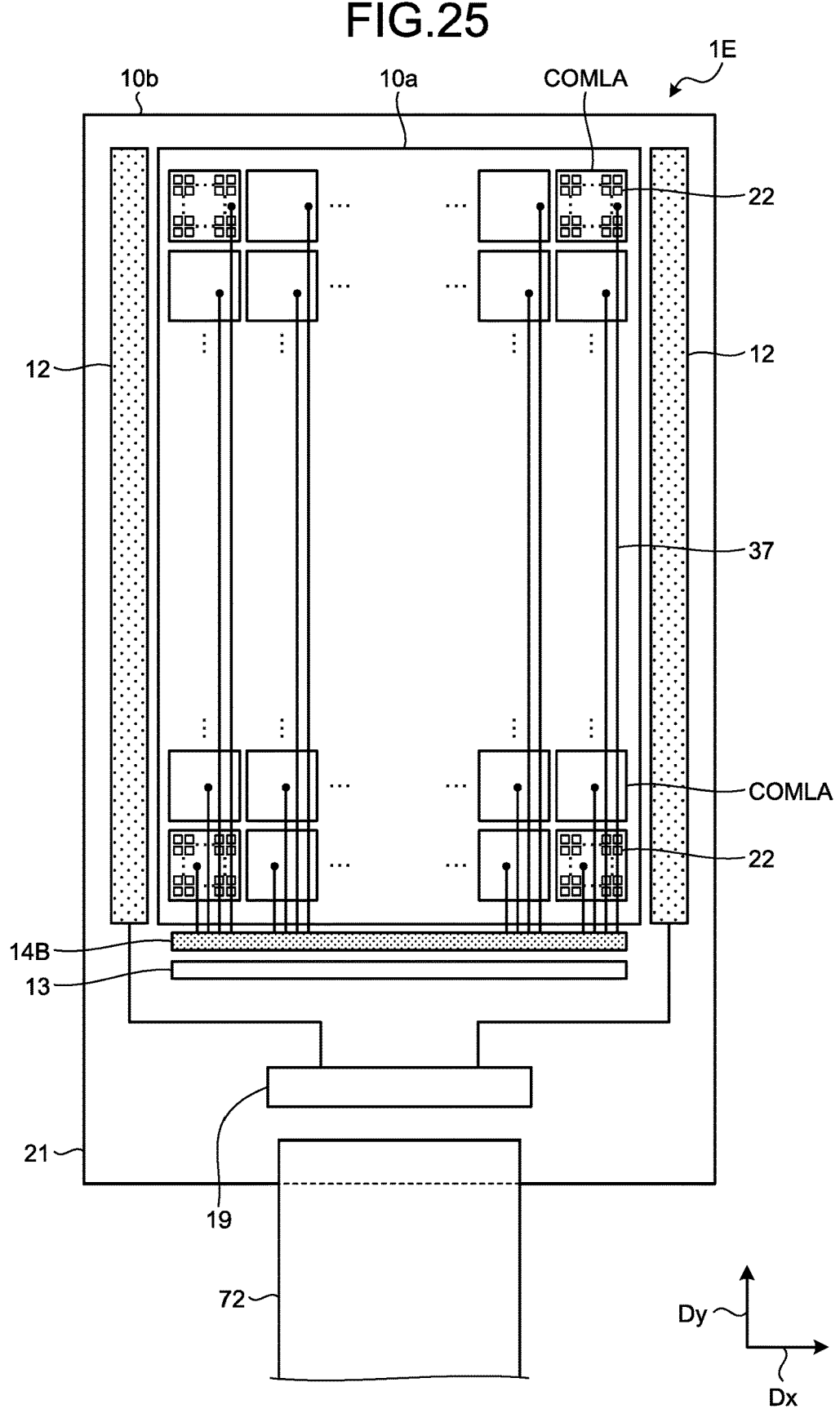
FIG. 25 is a plan view of a first substrate according to the sixth embodiment.
Figure 26:
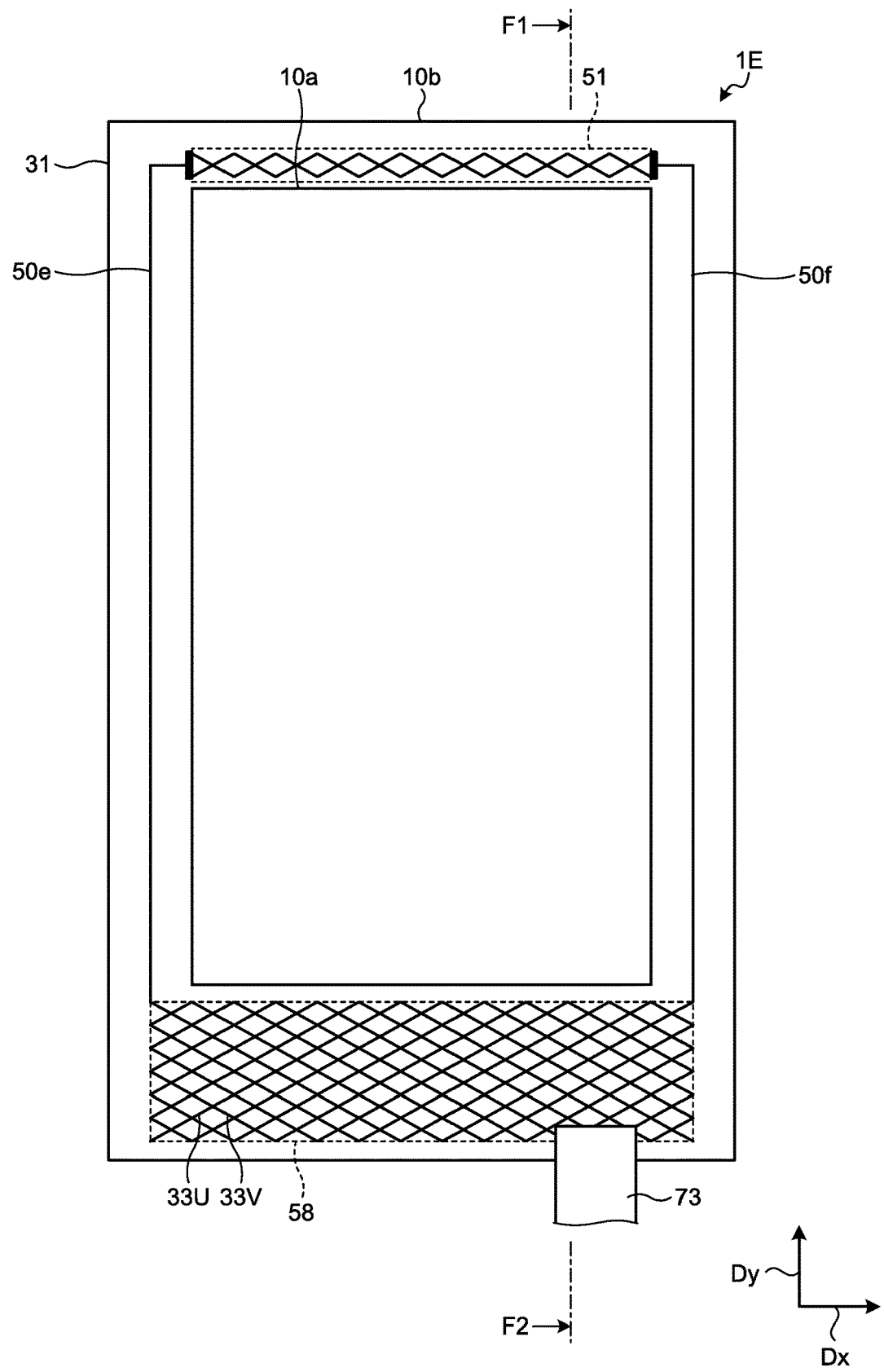
FIG. 26 is a plan view of a second substrate according to the sixth embodiment.

FIG. 24 is a sectional view representing a schematic sectional structure of a display device according to a sixth embodiment. FIG. 25 is a plan view of a first substrate according to the sixth embodiment. FIG. 26 is a plan view of a second substrate according to the sixth embodiment. FIG. 24 is a sectional view taken along the XXIV-XXIV line in FIG. 26.

As illustrated in FIG. 24 and FIG. 25, a plurality of drive electrodes COMLA are arranged on the first substrate 21. In a display device 1E of this embodiment, the drive electrodes COMLA function as detection electrodes for touch detection. For this reason, none of the detection electrodes TDL and TDLA are provided on the second substrate 31 as illustrated in FIG. 24. The first shielding layer 51, an eighth shielding layer 58, and the protective layer 38 are provided on the second substrate 31.

The conductive adhesive layer 39 is provided on almost the entire surface of the second substrate 31 and between the protective layer 38 and the polarizing plate 35. The first shielding layer 51 and the eighth shielding layer 58 are provided between the second substrate 31 and the conductive adhesive layer 39 in a direction perpendicular to a surface of the second substrate 31. Consequently, the conductive adhesive layer 39 is in contact with the first shielding layer 51 and the eighth shielding layer 58. The eighth shielding layer 58 is electrically coupled to the first substrate 21 via a coupling member 73. A coupling section 73a of the coupling member 73 is coupled to the first substrate 21.

As illustrated in FIG. 25, a plurality of the drive electrodes COMLA are disposed in a matrix (row-column configuration) in the display region 10a of the first substrate 21. In other words, a plurality of the drive electrodes COMLA are arranged in the first direction Dx and the second direction Dy. A plurality of pixel electrodes 22 are arranged overlapping each of the drive electrodes COMLA. While part of the drive electrodes COMLA and the pixel electrodes 22 are illustrated in FIG. 25, the drive electrodes COMLA and the pixel electrodes 22 are disposed in matrix (row-column configuration) in the entire display region 10a.

The drive electrodes COMLA are coupled to a drive-electrode driver 14B via respective wires 37. During display operation, the drive-electrode driver 14B supplies display drive signals Vcomdc to all the drive electrodes COMLA.

During self-capacitance touch detection, the drive-electrode driver 14B supplies detection drive signals Vcom to the drive electrodes COMLA simultaneously or in a time-division manner. The drive electrodes COMLA output signals depending on a change in the capacitance of the drive electrodes COMLA to the voltage detector DET. Based on sensor-output signals from the respective drive electrodes COMLA, the display device 1E performs touch detection on the touch detection surface. In other words, the drive electrodes COMLA functions as common electrodes during display operation, and also functions as detection electrodes during touch detection by the self-capacitance method.

As illustrated in FIG. 26, none of the detection electrodes TDL and TDLA are provided on the second substrate 31 in the display region 10a. The first shielding layer 51 and the eighth shielding layer 58 are provided in the peripheral region 10b of the second substrate 31. The eighth shielding layer 58 includes first conductive thin wires 33U and second conductive thin wires 33V and is formed in a mesh-like structure similar to the first shielding layer 51.

The first shielding layer 51 as a whole extends in the first direction Dx, and is provided along one edge of the outer perimeter of the display region 10a. The eighth shielding layer 58 is provided, in the peripheral region 10b, opposite across the display region 10a to the first shielding layer 51. That is, the eighth shielding layer 58 faces the first shielding layer 51 across the display region 10a in the second direction Dy.

A wire 50e is coupled to one end of the first shielding layer 51, and a wire 50f is coupled to the other end thereof. The wire 50e is provided along one of the long edges of the peripheral region 10b. The wire 50f is provided along the other long edge of the peripheral region 10b. The wires 50e and 50f are individually coupled to the eighth shielding layer 58. As a result of this configuration, the first shielding layer 51, the wires 50e and 50f, and the eighth shielding layer 58 are coupled to one another in a loop.

The coupling member 73 is coupled to the eighth shielding layer 58. The coupling member 73 is, for example, a conductive tape. The first shielding layer 51 and the eighth shielding layer 58 are coupled to the first substrate 21 via the coupling member 73. The first shielding layer 51 and the eighth shielding layer 58 are electrically coupled to the flexible substrate 72 of the first substrate 21. Alternatively, the first shielding layer 51 and the eighth shielding layer 58 may be grounded via the coupling member 73 to, for example, a housing of the display device 1E.

Figure 27:
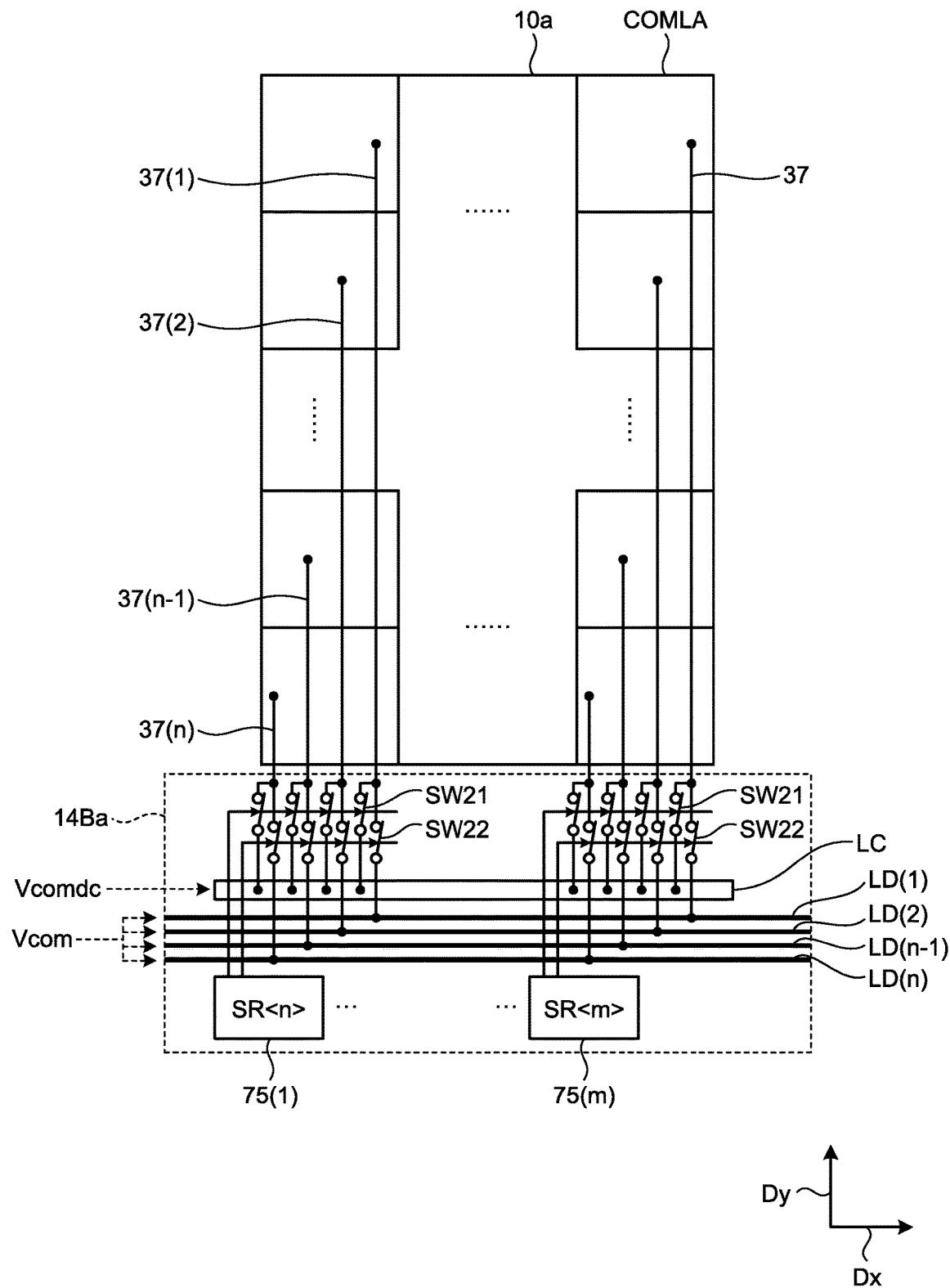
FIG. 27 is a circuit diagram illustrating an example of a drive circuit according to the sixth embodiment.

FIG. 27 is a circuit diagram illustrating an example of a drive circuit according to the sixth embodiment. A drive circuit 14Ba illustrated in FIG. 27 is a scanner circuit that sequentially scans the drive electrodes COMLA. The drive circuit 14Ba is included in the drive-electrode driver 14B illustrated in FIG. 25, and is provided in the peripheral region 10b of the first substrate 21.

The drive electrodes COMLA are arranged as illustrated in FIG. 27. In the drive electrodes COMLA, for example, m drive electrodes COMLA are arranged in the first direction Dx, and n drive electrodes COMLA are arranged in the second direction Dy. Respective lines of the drive electrodes COMLA are coupled to respective wires 37(1), 37(2), . . . , 37(n−1), and 37(n), the lines being arranged in parallel to one another in the second direction Dy.

The drive circuit 14Ba includes switches SW21, switches SW22, wires LC, LD(1), LD(2), . . . , LD(n−1), and LD(n), and shift registers 75(1), . . . , and 75(m). The respective shift registers 75(1), . . . , and 75(m) are provided corresponding to lines of drive electrodes COMLA, the lines being arranged in parallel to one another in the first direction Dx.

In the following description, the term "shift register 75" is used to represent each of the shift registers 75(1), . . . , and 75(m) when there is no need to distinguish therebetween in description thereof. The term "wire 37" is used to represent each of the wires 37(1), 37(2), . . . , 37(n−1), and 37(n) when there is no need to distinguish therebetween in description thereof. The term "wire LD" is used to represent each of the wires LD(1), LD(2), . . . , LD(n−1), and LD(n) when there is no need to distinguish therebetween in description thereof.

The respective switches SW21 and the respective switches SW22 are coupled to the drive electrodes COMLA. One end of each of the switches SW21 is coupled via the corresponding wire 37 to the corresponding drive electrode COMLA. The other end of the switch SW21 is coupled to the wire LC. One end of each of the switches SW22 is coupled via the corresponding wire 37 to the corresponding drive electrode COMLA. The other end of the switch SW22 is coupled to the wire LD. The wires LD(1), LD(2), . . . , LD(n−1), and LD(n) are provided corresponding to the wires 37(1), 37(2), . . . , 37(n−1), and 37(n), respectively. Each of the shift registers 75 corresponds to the drive electrodes COMLA that are arranged side by side in the second direction Dy.

Operation of the switches SW21 and the switches SW22 is controlled by scanning signals supplied from the corresponding shift registers 75. In the example illustrated in FIG. 27, each of the switches SW21 and the corresponding switch SW22 operate in reverse manners. For example, when the same scanning signal is supplied, the switch SW22 is turned off if the switch SW21 is turned on, and the switch SW22 is turned on if the switch SW21 is turned off.

Display drive signals Vcomdc are supplied to the drive electrodes COMLA via the wire LC. Detection drive signals Vcom are supplied to the drive electrodes COMLA via the wires LD.

In this embodiment, the shift registers 75(1), . . . , and 75(m) start scanning in response to scanning-start signals from the controller 11. The shift registers 75(1), . . . , and 75(m) sequentially supply scanning signals in synchronization with clock signals from the controller 11.

Each of the switches SW21 is turned off and the corresponding switch SW22 is turned on, in response to a scanning signal supplied from the corresponding shift register 75. Consequently, a drive signal Vcom is supplied via one of the wires LD and one of the switches SW22 to the drive electrode COMLA that is to be driven. In the example illustrated in FIG. 27, the drive electrodes COMLA that are arranged side by side in the second direction Dy are concurrently selected by a scanning signal from the corresponding shift register 75. The drive signals Vcom are then concurrently supplied via the wires LD(1), LD(2), . . . , LD(n−1), and LD(n) and the wires 37(1), 37(2), . . . , 37(n−1), and 37(n) to the drive electrodes COMLA that are arranged side by side in the second direction Dy.

In contrast, each of the switches SW21 is turned on and the corresponding switch SW22 is turned off, if there is no scanning signal supplied. Consequently, a drive signal Vcomdc is supplied via the wire LC and the switch SW21 to an unselected one of the drive electrodes COMLA that has not been selected as a drive electrode to be driven.

The eighth shielding layer 58 is disposed overlapping parts of the respective wires LC and LD, the respective switches SW21, and the respective switches SW22 of the drive circuit 14Ba in planar view. This configuration enables the eighth shielding layer 58 to shield electromagnetic noise generated by the drive circuit 14Ba. Consequently, the detection performance can be prevented from being deteriorated by noise generated by the drive circuit 14Ba.

Also in this embodiment, as illustrated in FIG. 24, the conductive adhesive layer 39 is in contact with the eighth shielding layer 58 in the peripheral region 10b. Consequently, as in the example illustrated in FIG. 12, static electricity SE flows from the polarizing plate 35 to the eighth shielding layer 58 through the conductive adhesive layer 39. The static electricity SE flows via the coupling member 73 to, for example, the housing of the display device 1E. Consequently, the polarizing plate 35 can be prevented from being charged. The static electricity SE flows to the eighth shielding layer 58, and thereby can be prevented from flowing to the drive electrode COMLA. As described above, the display device 1E of this embodiment can prevent the static electricity SE from degrading the display quality and reducing the touch detection accuracy.

Seventh Embodiment

Figure 28:
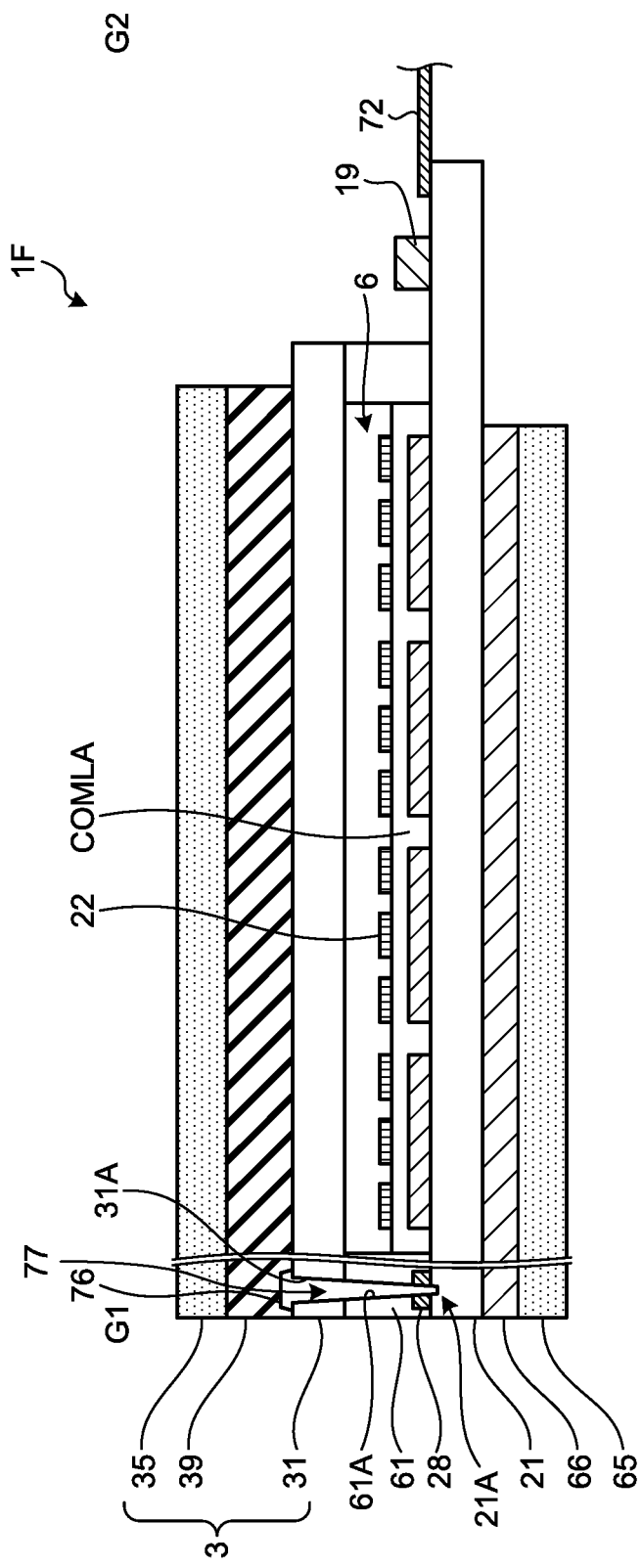
FIG. 28 is a sectional view representing a schematic sectional structure of a display device according to a seventh embodiment.
Figure 29:
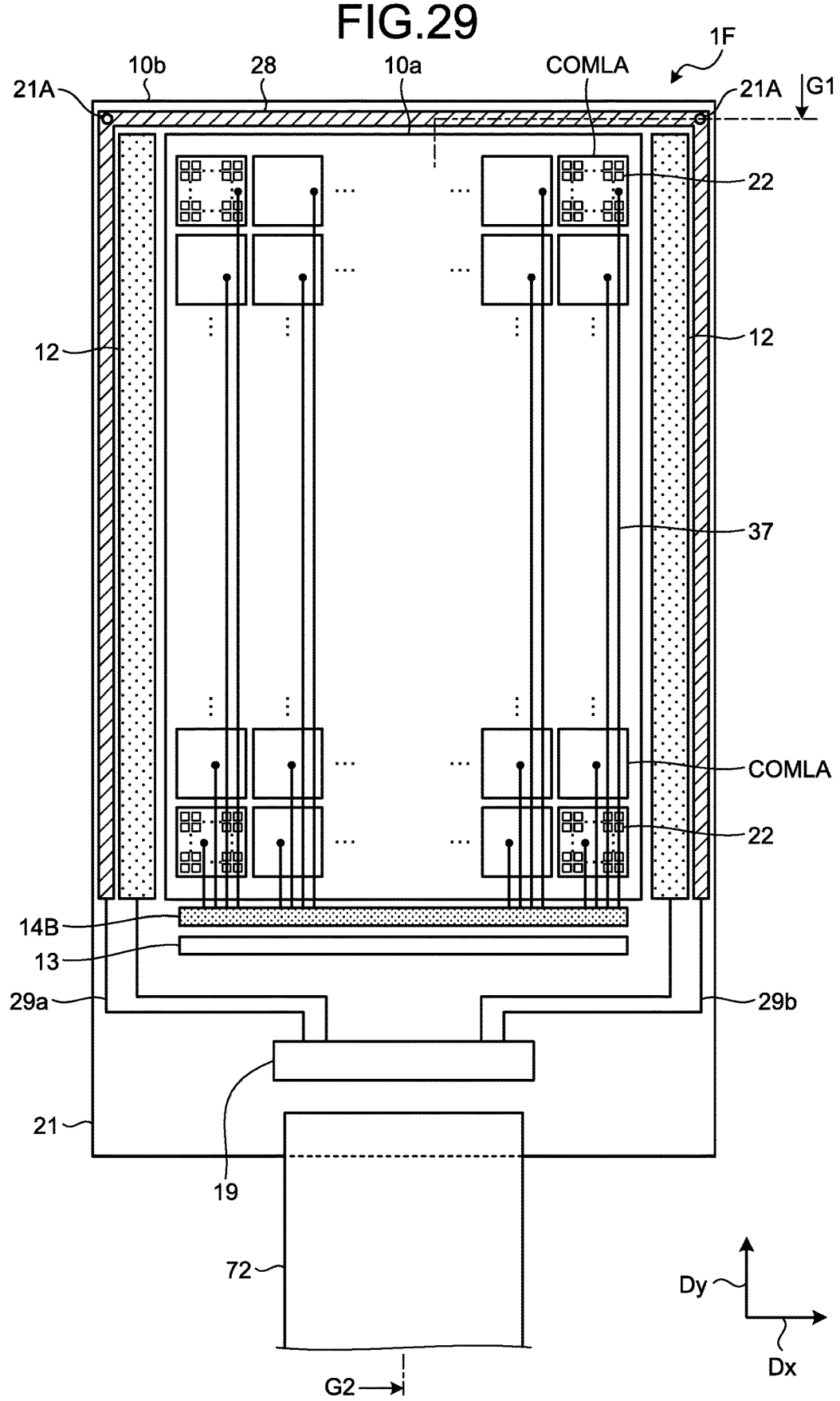
FIG. 29 is a plan view of a first substrate according to the seventh embodiment.
Figure 30:
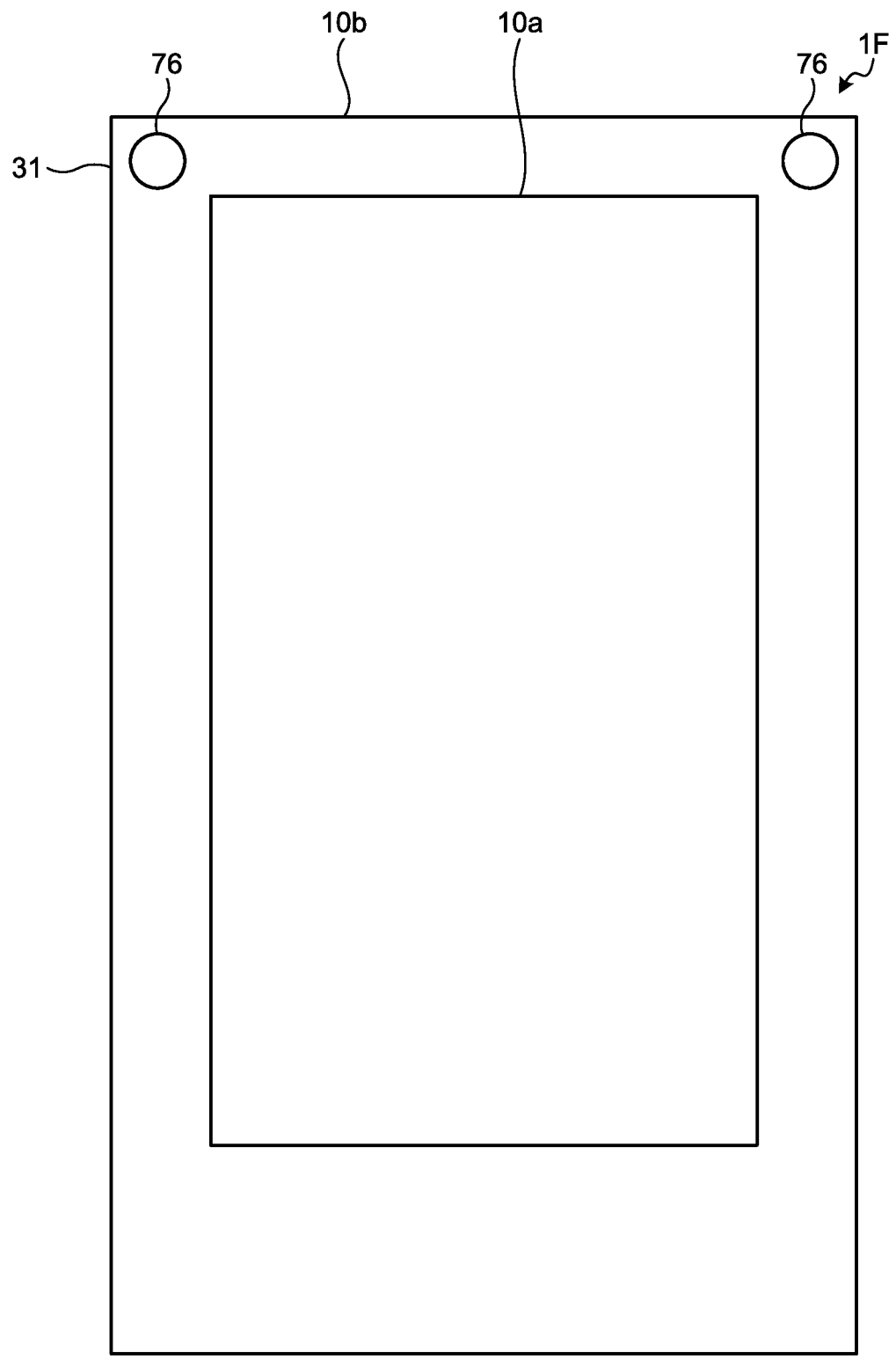
FIG. 30 is a plan view of a second substrate according to the seventh embodiment.

FIG. 28 is a sectional view representing a schematic sectional structure of a display device according to a seventh embodiment. FIG. 29 is a plan view of a first substrate according to the seventh embodiment. FIG. 30 is a plan view of a second substrate according to the seventh embodiment. FIG. 28 is a sectional view taken along the XXVIII-XXVIII line in FIG. 29.

Also in a display device 1F of this embodiment, the drive electrodes COMLA function as detection electrodes for touch detection. As illustrated in FIG. 28, the conductive adhesive layer 39 is provided between the second substrate 31 and the polarizing plate 35. The conductive adhesive layer 39 is provided on and in direct contact with almost the entire surface of the second substrate 31.

As illustrated in FIG. 30, terminal sections 76 are provided in the peripheral region 10b of the second substrate 31. In planar view, the terminal sections 76 are provided in positions overlapping a guard ring 28 to be described later. In the example illustrated in FIG. 30, there are two such terminal sections 76. However, this example is not limiting, and only one terminal section 76 or three or more terminal sections 76 may be provided. The positions of the terminal sections 76 are not particularly limited, and may be any positions that overlap the guard ring 28. In this embodiment, none of the detection electrodes TDL and TDLA are provided on the second substrate 31 in the display region 10a, and none of the first shielding layer 51, the eighth shielding layer 58, and the like are provided in the peripheral region 10b.

As illustrated in FIG. 28, a through-hole 31A is provided to the peripheral region 10b of the second substrate 31. The through-hole 31A is provided penetrating the second substrate 31 from one of the surfaces thereof to the other surface. Another through-hole 61A is provided to the sealing section 61. The through-hole 61A is provided penetrating a part between the first substrate 21 and the second substrate 31. A recessed portion 21A is further provided on a surface of the first substrate 21, the surface facing the sealing section 61. The through-hole 31A, the through-hole 61A, and the recessed portion 21A are provided communicating with one another.

The through-hole 31A, the through-hole 61A, and the recessed portion 21A can be formed by etching, laser processing, or the like. For example, the through-hole 31A, the through-hole 61A, and the recessed portion 21A can be formed at one time by irradiated, with laser, a laminate that has the first substrate 21 and the second substrate 31 stacked with the sealing section 61 therebetween. In such a case, a carbon dioxide laser apparatus is applicable as a laser source. This example is not limiting, and the laser source may be any laser source capable of making holes in glass materials and organic-matter based materials and may be, for example, an excimer laser apparatus.

A coupling member 77 is provided inside the through-hole 31A, the through-hole 61A, and the recessed portion 21A. The coupling member 77 contains a conductive material such as copper (Cu) or silver (Ag). The through-hole 31A, the through-hole 61A, and the recessed portion 21A are filled with the coupling member 77. This example is not limiting, and the coupling member 77 may be provided inside the through-hole 31A, the through-hole 61A, and the recessed portion 21A and may have a shape with a void inside in planar view.

The coupling member 77 couples the terminal section 76 provided on the second substrate 31 to the guard ring 28 provided on the first substrate 21. This configuration allows the conductive adhesive layer 39 to be electrically coupled to the guard ring 28 via the through-hole 31A and the through-hole 61A.

As illustrated in FIG. 29, the guard ring 28 is provided in the peripheral region 10b of the first substrate 21. The guard ring 28 is provided along three edges of the peripheral region 10b other than the edge thereof having the flexible substrate 72. One end of the guard ring 28 is coupled to the display IC 19 via a wire 29a, and the other end thereof is coupled to the display IC 19 via a wire 29b. In a region enclosed by the guard ring 28 and the wires 29a and 29b, various circuits such as the gate driver 12 and the drive-electrode driver 14B, the drive electrodes COMLA, and wires 37 are disposed.

The drive-electrode driver 14 (see FIG. 1) supplies a guard signal to the guard ring 28 during touch detection. The guard signal is a voltage signal synchronized with and having the same potential as a drive signal Vcom. This guard signal drives the guard ring 28 at the same potential as the drive electrodes COMLA. Consequently, a parasitic capacitance of the drive electrode COMLA is reduced, and higher touch detection performance can be achieved.

In this embodiment, the conductive adhesive layer 39 is coupled to the guard ring 28 via the terminal section 76 and the coupling member 77. This configuration causes static electricity SE to flow from the polarizing plate 35 to the guard ring 28 through the conductive adhesive layer 39, the terminal section 76, and the coupling member 77. The static electricity SE flows through the guard ring 28 to, for example, a housing of the display device 1F. Consequently, the polarizing plate 35 can be prevented from being charged. The static electricity SE flows to the guard ring 28, and thereby can be prevented from flowing to the drive electrodes COMLA. As described above, the display device 1F of this embodiment can prevent the static electricity SE from degrading the display quality and reducing the touch detection accuracy.

Although the conductive adhesive layer 39 is coupled to the guard ring 28 in this embodiment, this example is not limiting. The conductive adhesive layer 39 may be coupled via the through-hole 31A to a conductive layer provided between the conductive adhesive layer 39 and the first substrate 21. Although this embodiment illustrates the guard ring 28 as being provided along three edges of the peripheral region 10b, this example is not limiting. The guard ring 28 may be provided along at least one of the edges of the peripheral region 10b. The guard ring 28 may be provided along any two edges of the peripheral region 10b. In such a case, the two edges may be edges intersecting or parallel to each other. Preferably, however, the guard ring 28 is provided along the wires 37 in order to prevent the touch detection accuracy from being reduced by noise.

While preferred embodiments of the present invention have been described heretofore, these embodiments are not intended to limit the present invention. Descriptions disclosed in these embodiments are merely illustrative, and can be changed variously without departing from the spirit of the present invention. Changes made without departing from the spirit of the present invention naturally fall within the technical scope of the present invention.

The display device according to embodiments can have the following aspects.

(1) A detection device comprising:
a substrate;
a detection electrode provided in a display region on a plane parallel to the substrate, the detection electrode including a plurality of metal wires;
a first conductive layer provided in a peripheral region located to the outside of the display region;
a protective layer provided on the detection electrode;
a polarizing plate provided above the protective layer; and
a second conductive layer provided between the polarizing plate and the protective layer in a direction perpendicular to the substrate, wherein
the second conductive layer has a higher sheet resistance than the metal wires and is electrically coupled to the first conductive layer.
(2) The detection device according to (1), wherein
a terminal section coupled to a flexible substrate is provided on the substrate in a first part of the peripheral region, the first part extending along a first edge of the peripheral region, and
the first conductive layer is provided in a second part of the peripheral region, the second part extending along a second edge of the peripheral region, the second edge being opposite across the display region to the first edge.
(3) The detection device according to (1), wherein
a terminal section coupled to a flexible substrate is provided on the substrate in a first part of the peripheral region, the first part extending along a first edge of the peripheral region, and
the first conductive layer is provided in the first part.
(4) The detection device according to (1), wherein
a terminal section coupled to a flexible substrate is provided on the substrate in a first part of the peripheral region, the first part extending along a first edge of the peripheral region, and
the first conductive layer is provided in a third part of the peripheral region, the third part extending along a third edge of the peripheral region, the third edge extending in a direction intersecting the first edge.
(5) The detection device according to (1), wherein the second conductive layer has a sheet resistance that is lower than a sheet resistance of the polarizing plate and higher than a sheet resistance of the first conductive layer.
(6) The detection device according to (1), wherein the first conductive layer is supplied with a voltage signal having a potential equal to a potential of the detection electrode.
(7) The detection device according to (1), wherein the first conductive layer includes a plurality of wires forming a mesh-like pattern.
(8) The detection device according to (1), wherein
the first conductive layer is provided in the display region and the peripheral region, the first conductive layer being in contact with the metal wires, the first conductive layer being provided between the substrate and the metal wires in a direction perpendicular to the substrate, and
the second conductive layer is in contact with a part of the first conductive layer, the part being provided outside the detection electrode.
(9) The detection device according to (8), wherein the second conductive layer has a sheet resistance that is lower than a sheet resistance of the polarizing plate and equal to or lower than a sheet resistance of the first conductive layer.
(10) The detection device according to (8), wherein each of the first conductive layer and the second conductive layer is a light-transmissive conductive layer.
(11) The detection device according to (1), wherein a plurality of detection electrodes are disposed in a matrix configuration in the display region.
(12) The detection device according to (1), wherein the second conductive layer is a conductive adhesive layer.
(13) The detection device according to (1), wherein:
the protective layer has a recessed portion,
the second conductive layer is in direct contact with the first conductive layer via the recessed portion.
(14) A display device comprising:
a detection device according to (1);
a plurality of pixel electrodes provided on a plane parallel to the substrate, the pixel electrodes being disposed facing the detection electrode in a matrix configuration; and
a display function layer configured to be driven by signals.
(15) The display device according to (14), further comprising:
a drive electrode provided on a plane parallel to the substrate, the drive electrode being configured to generate a capacitance between the drive electrode and the detection electrode.
(16) A detection device comprising:
a first substrate;
a plurality of detection electrodes disposed in a matrix configuration in a display region on a plane parallel to the first substrate;
a second substrate facing the first substrate;
a first conductive layer provided in a peripheral region located to the outside the display region in planar view;
a polarizing plate provided above the second substrate; and
a second conductive layer provided between the polarizing plate and the second substrate, wherein
the second conductive layer is electrically coupled to the first conductive layer.
(17) The detection device according to (16), wherein the first conductive layer is provided between the second substrate and the second conductive layer in a direction perpendicular to a surface of the second substrate.
(18) The detection device according to (17), wherein the first conductive layer is electrically coupled via a conductive coupling member toward the first substrate.
(19) The detection device according to (16), wherein
the first conductive layer is provided in the peripheral region of the first substrate, and
the second conductive layer is electrically coupled to the first conductive layer via a through-hole formed through the second substrate.

What is claimed is:
1. A detection device comprising:
a substrate;
a detection electrode provided in a display region on a plane parallel to the substrate, the detection electrode including a plurality of metal wires;
a first conductive layer provided in a peripheral region located to the outside of the di splay region;
a protective layer provided on the detection electrode;
a polarizing plate provided above the protective layer; and
a second conductive layer provided between the polarizing plate and the protective layer in a direction perpendicular to the substrate, wherein
the second conductive layer has a higher sheet resistance than the metal wires and is electrically coupled to the first conductive layer, and the first conductive layer is supplied with a voltage signal having a potential equal to a potential of the detection electrode.

2. The detection device according to claim 1, wherein
a terminal section coupled to a flexible substrate is provided on the substrate in a first part of the peripheral region, the first part extending along a first edge of the peripheral region, and
the first conductive layer is provided in a second part of the peripheral region, the second part extending along a second edge of the peripheral region, the second edge being opposite across the display region to the first edge.

3. The detection device according to claim 1, wherein
a terminal section coupled to a flexible substrate is provided on the substrate in a first part of the peripheral region, the first part extending along a first edge of the peripheral region, and
the first conductive layer is provided in the first part.

4. The detection device according to claim 1, wherein
a terminal section coupled to a flexible substrate is provided on the substrate in a first part of the peripheral region, the first part extending along a first edge of the peripheral region, and
the first conductive layer is provided in a third part of the peripheral region, the third part extending along a third edge of the peripheral region, the third edge extending in a direction intersecting the first edge.

5. The detection device according to claim 1, wherein the second conductive layer has a sheet resistance that is lower than a sheet resistance of the polarizing plate and higher than a sheet resistance of the first conductive layer.

6. The detection device according to claim 1, wherein a plurality of detection electrodes are disposed in a matrix configuration in the display region.

7. The detection device according to claim 1, wherein the second conductive layer is a conductive adhesive layer.

8. A display device comprising:
a detection device according to claim 1;
a plurality of pixel electrodes provided on a plane parallel to the substrate, the pixel electrodes being disposed facing the detection electrode in a matrix configuration; and
a display function layer configured to be driven by signals.

9. The display device according to claim 8, further comprising:
a drive electrode provided on a plane parallel to the substrate, the drive electrode being configured to generate a capacitance between the drive electrode and the detection electrode.

10. A detection device comprising:
a substrate;
a detection electrode provided in a display region on a plane parallel to the substrate, the detection electrode including a plurality of metal wires;
a first conductive layer provided in a peripheral region located to the outside of the display region;
a protective layer provided on the detection electrode;
a polarizing plate provided above the protective layer; and
a second conductive layer provided between the polarizing plate and the protective layer in a direction perpendicular to the substrate;
wherein
the second conductive layer has a higher sheet resistance than the metal wires and is electrically coupled to the first conductive layer, and
the first conductive layer includes a plurality of wires forming a mesh-like pattern.

11. The detection device according to claim 10, wherein the second conductive layer has a sheet resistance that is lower than a sheet resistance of the polarizing plate and higher than a sheet resistance of the first conductive layer.

12. The detection device according to claim 10, wherein the second conductive layer is a conductive adhesive layer.

13. A detection device comprising:
a substrate;
a detection electrode provided in a display region on a plane parallel to the substrate, the detection electrode including a plurality of metal wires;
a first conductive layer provided in a peripheral region located to the outside of the display region;
a protective layer provided on the detection electrode;
a polarizing plate provided above the protective layer; and
a second conductive layer provided between the polarizing plate and the protective layer in a direction perpendicular to the substrate,
wherein
the second conductive layer has a higher sheet resistance than the metal wires and is electrically coupled to the first conductive layer,
the first conductive layer is provided in the display region and the peripheral region, the first conductive layer being in contact with the metal wires, the first conductive layer being provided between the substrate and the metal wires in a direction perpendicular to the substrate, and
the second conductive layer is in contact with a part of the first conductive layer, the part being provided outside the detection electrode.

14. The detection device according to claim 13, wherein the second conductive layer has a sheet resistance that is lower than a sheet resistance of the polarizing plate and equal to or lower than a sheet resistance of the first conductive layer.

15. The detection device according to claim 13, wherein each of the first conductive layer and the second conductive layer is a light-transmissive conductive layer.

16. The detection device according to claim 13, wherein the second conductive layer is a conductive adhesive layer.

17. A detection device comprising:
a substrate;
a detection electrode provided in a display region on a plane parallel to the substrate, the detection electrode including a plurality of metal wires;
a first conductive layer provided in a peripheral region located to the outside of the display region;
a protective layer provided on the detection electrode;
a polarizing plate provided above the protective layer; and
a second conductive layer provided between the polarizing plate and the protective layer in a direction perpendicular to the substrate,
wherein
the second conductive layer has a higher sheet resistance than the metal wires and is electrically coupled to the first conductive layer,
the protective layer has a recessed portion, and
the second conductive layer is in direct contact with the first conductive layer via the recessed portion.

18. The detection device according to claim 17, wherein the second conductive layer has a sheet resistance that is lower than a sheet resistance of the polarizing plate and higher than a sheet resistance of the first conductive layer.

19. The detection device according to claim 17, wherein the second conductive layer is a conductive adhesive layer.

* * * * *